Figure 1:
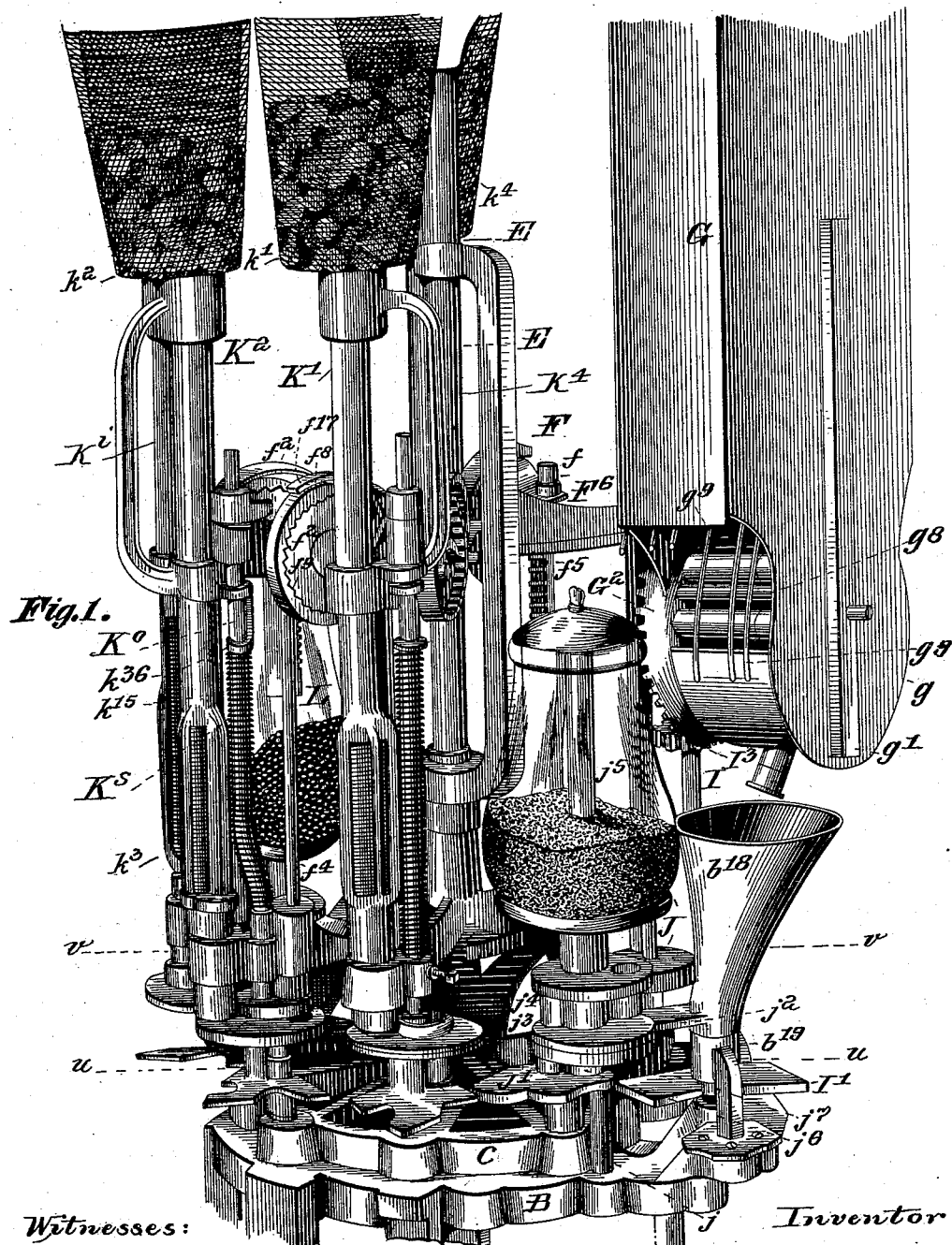

(No Model.) 16 Sheets—Sheet 1.
W. W. BABCOCK.
MACHINE FOR LOADING CARTRIDGE SHELLS.
No. 473,440. Patented Apr. 26, 1892.

Witnesses:
Arthur Ashley
James F. Duhamel.

Inventor
William W. Babcock
by J. Ashley atty.

(No Model.)

16 Sheets—Sheet 2.

W. W. BABCOCK.
MACHINE FOR LOADING CARTRIDGE SHELLS.

No. 473,440. Patented Apr. 26, 1892.

Witnesses:
James F. Duhamel
Arthur Ashley

Inventor:
William W. Babcock
by J. Ashley atty.

(No Model.)

W. W. BABCOCK.
MACHINE FOR LOADING CARTRIDGE SHELLS.

16 Sheets—Sheet 3.

No. 473,440. Patented Apr. 26, 1892.

Witnesses

Arthur Ashley
James F. Duhamel

Inventor
William W. Babcock
by
Atty.

(No Model.) 16 Sheets—Sheet 4.
W. W. BABCOCK.
MACHINE FOR LOADING CARTRIDGE SHELLS.

No. 473,440. Patented Apr. 26, 1892.

Witnesses:
Arthur Ashley
James F. Duhamel

Inventor:
William W. Babcock (No Model.) 16 Sheets—Sheet 5.
W. W. BABCOCK.
MACHINE FOR LOADING CARTRIDGE SHELLS.

No. 473,440. Patented Apr. 26, 1892.

Witnesses:
Arthur Ashley
James P. Duhamel

Inventor:
William W. Babcock
by
Atty.

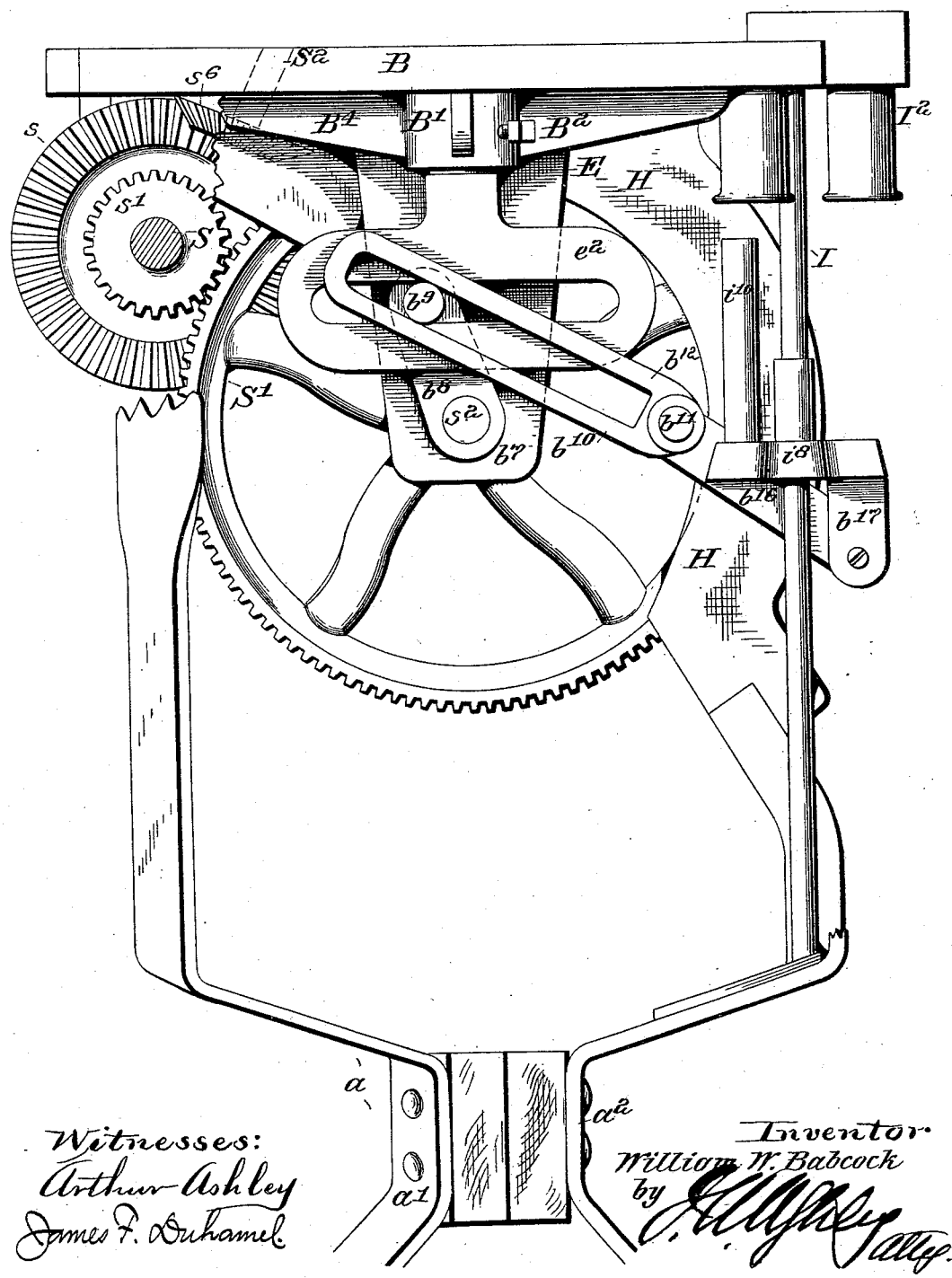

(No Model.) 16 Sheets—Sheet 7.
W. W. BABCOCK.
MACHINE FOR LOADING CARTRIDGE SHELLS.
No. 473,440. Patented Apr. 26, 1892.
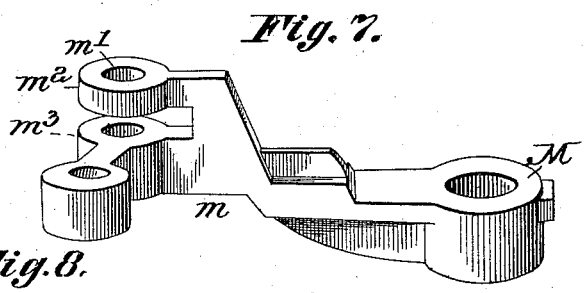
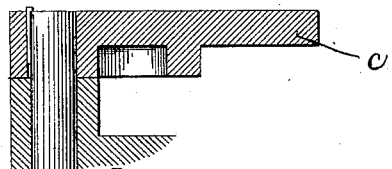
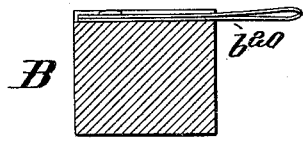
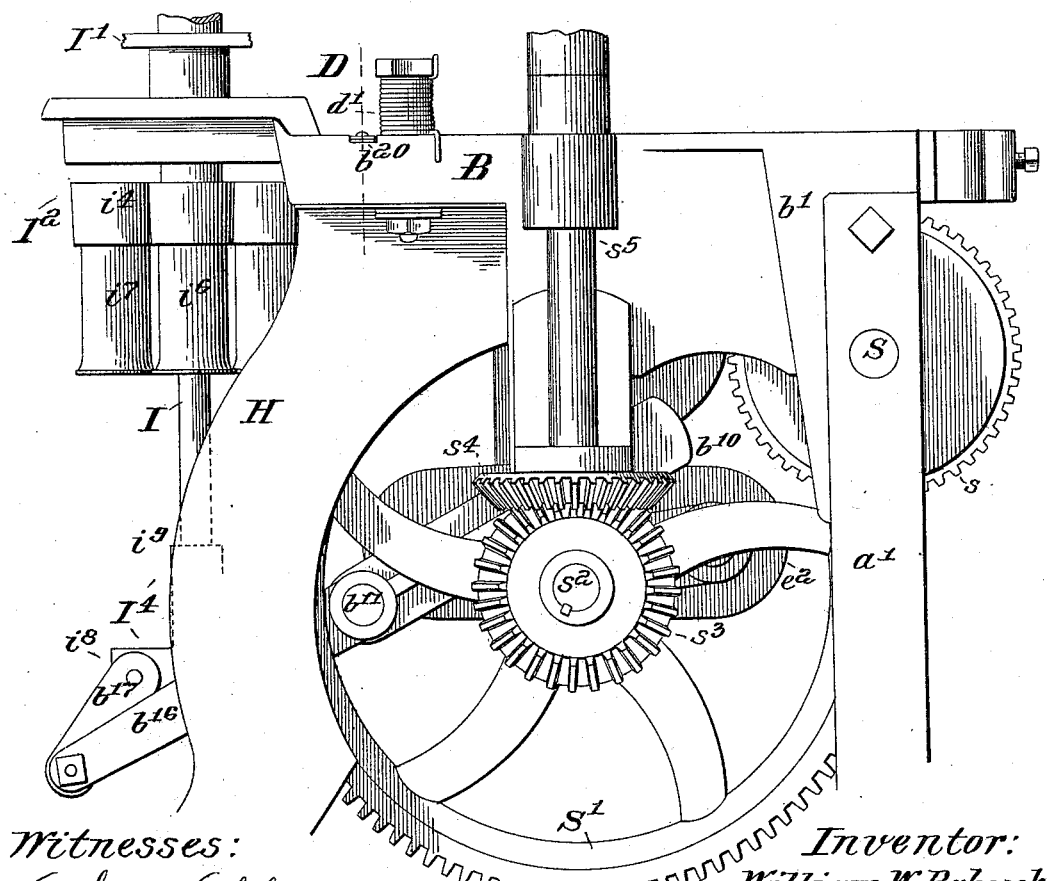
Witnesses:
Arthur Ashley
James F. Duhamel
Inventor:
William W. Babcock

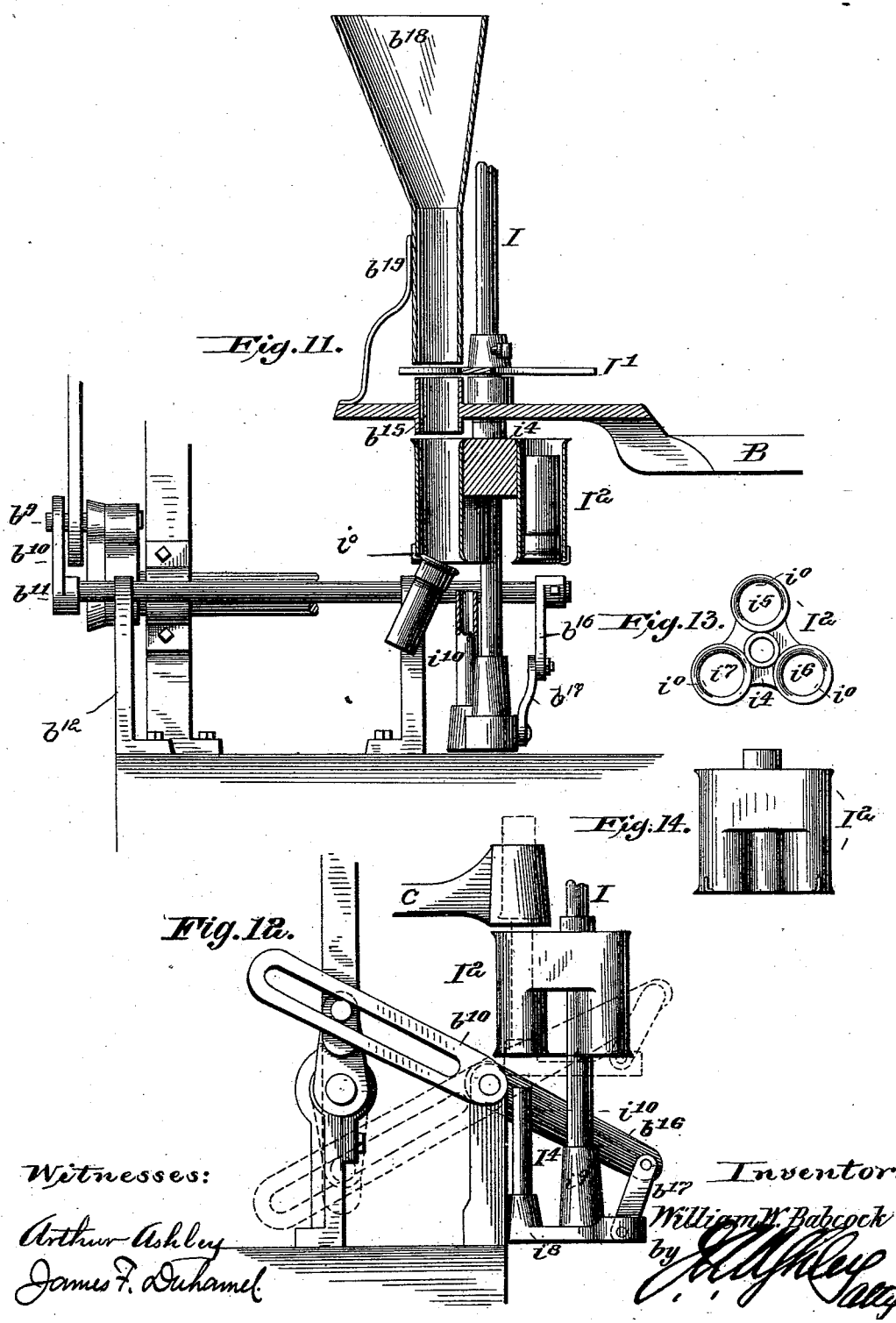

(No Model.) 16 Sheets—Sheet 9.
W. W. BABCOCK.
MACHINE FOR LOADING CARTRIDGE SHELLS.
No. 473,440. Patented Apr. 26, 1892.
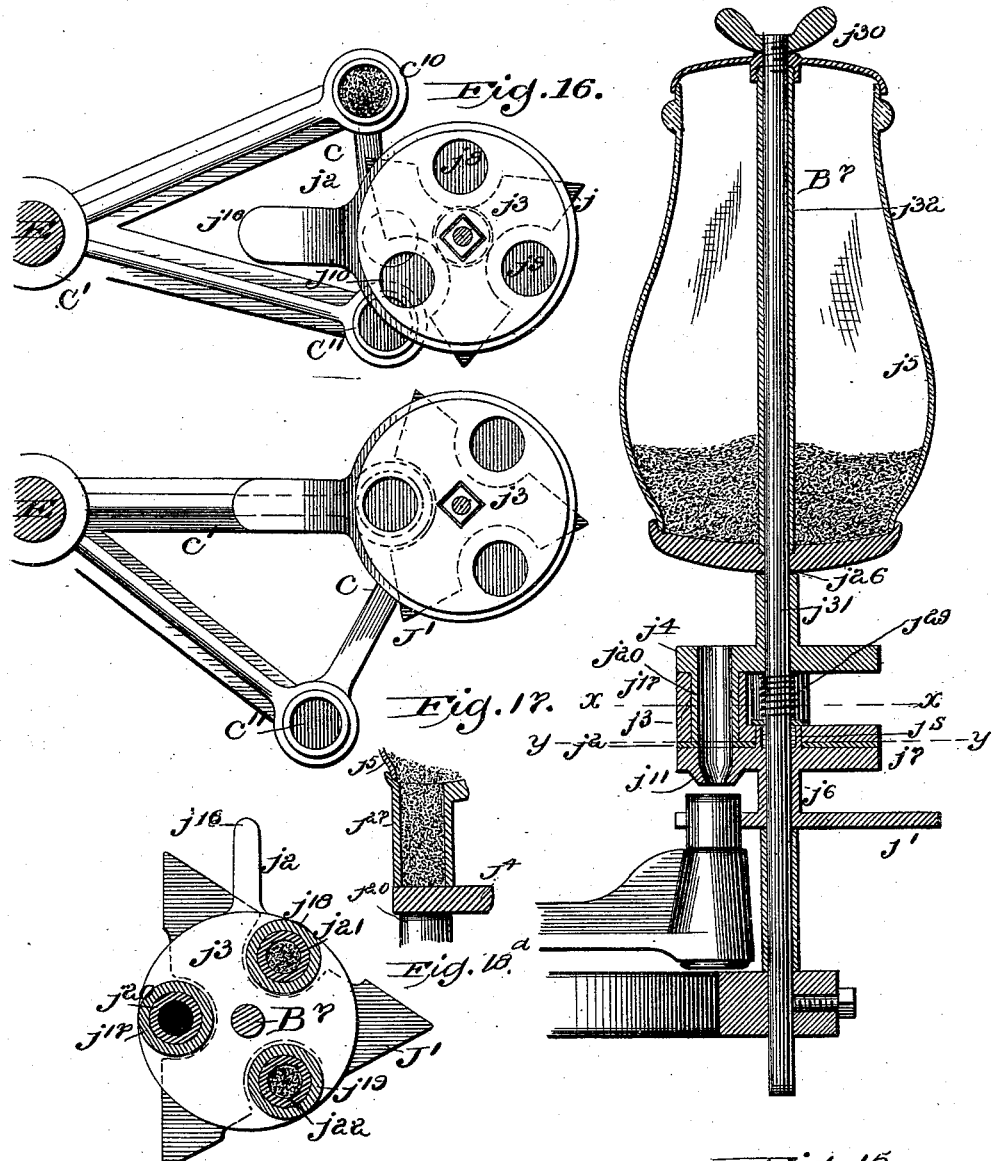
Witnesses:
Arthur Ashley
Horace A. Dodge
Inventor:
William W. Babcock
by J. A. Ashley atty.

(No Model.)　　　　　　　　　　16 Sheets—Sheet 10.
W. W. BABCOCK.
MACHINE FOR LOADING CARTRIDGE SHELLS.
No. 473,440.　　　　　　　　　Patented Apr. 26, 1892.
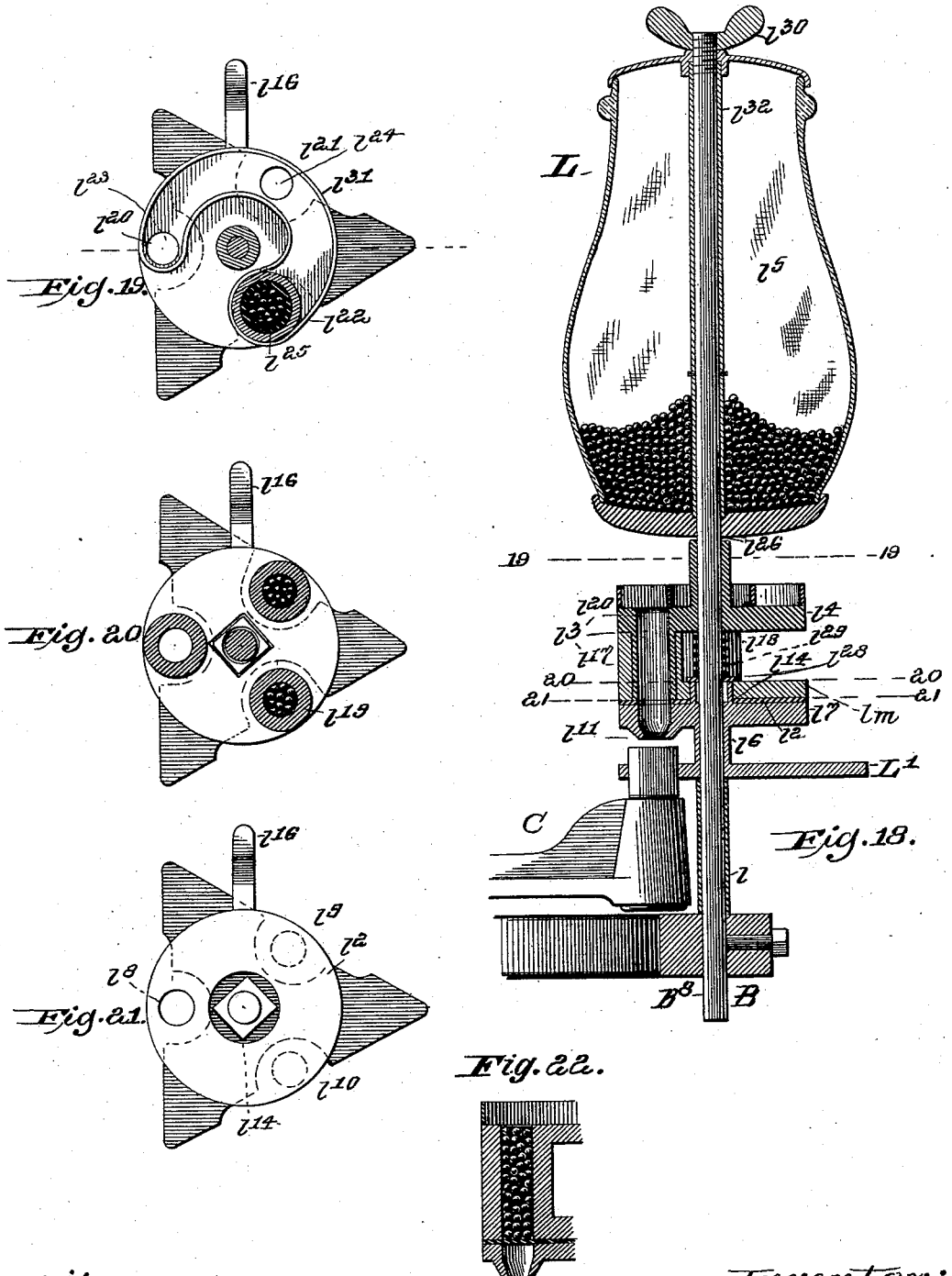
Witnesses:
Arthur Ashley
Horace A. Dodge.
Inventor:
William W. Babcock
by Ashley atty.

(No Model.)
W. W. BABCOCK.
MACHINE FOR LOADING CARTRIDGE SHELLS.
No. 473,440. Patented Apr. 26, 1892.
16 Sheets—Sheet 11.
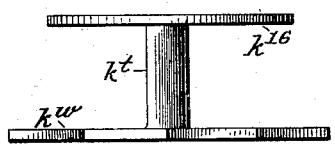
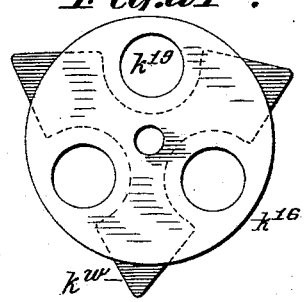
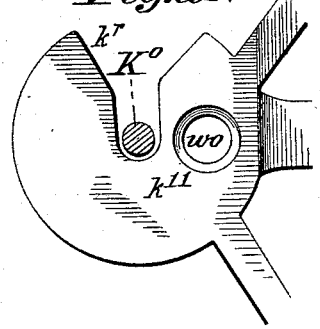
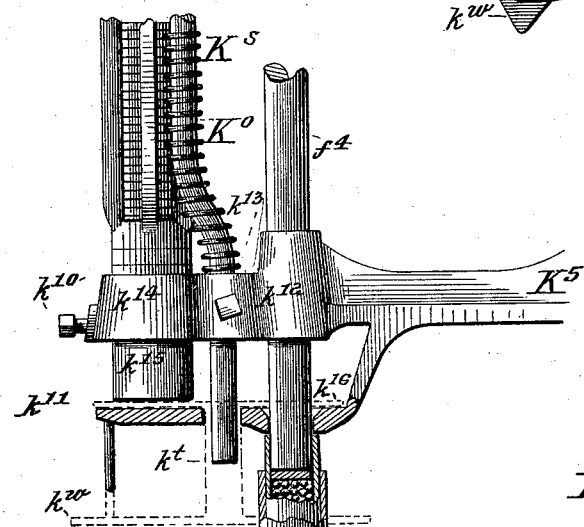
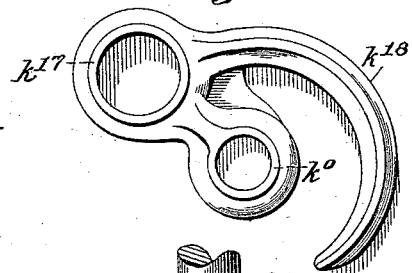
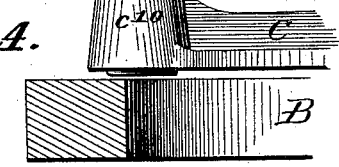
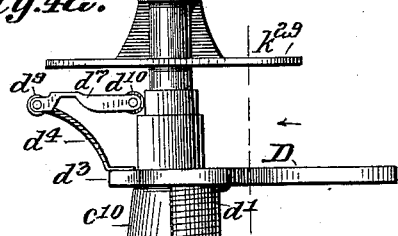
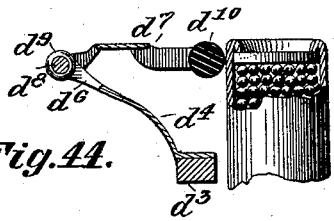
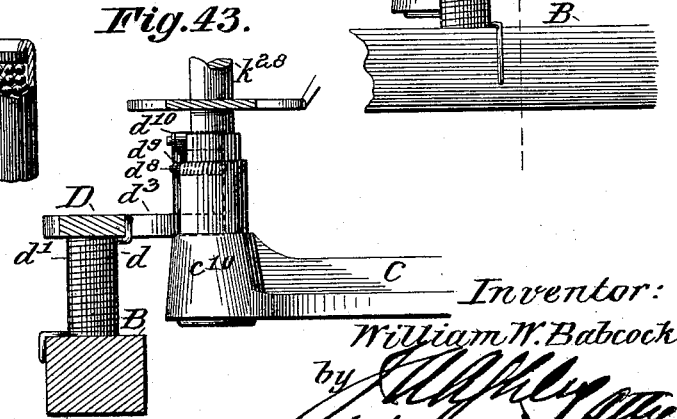

(No Model.) 16 Sheets—Sheet 12.
W. W. BABCOCK.
MACHINE FOR LOADING CARTRIDGE SHELLS.

No. 473,440. Patented Apr. 26, 1892.

Witnesses:
Arthur Ashley
James F. Duhamel

Inventor:
William W. Babcock
by Ashley
Atty.

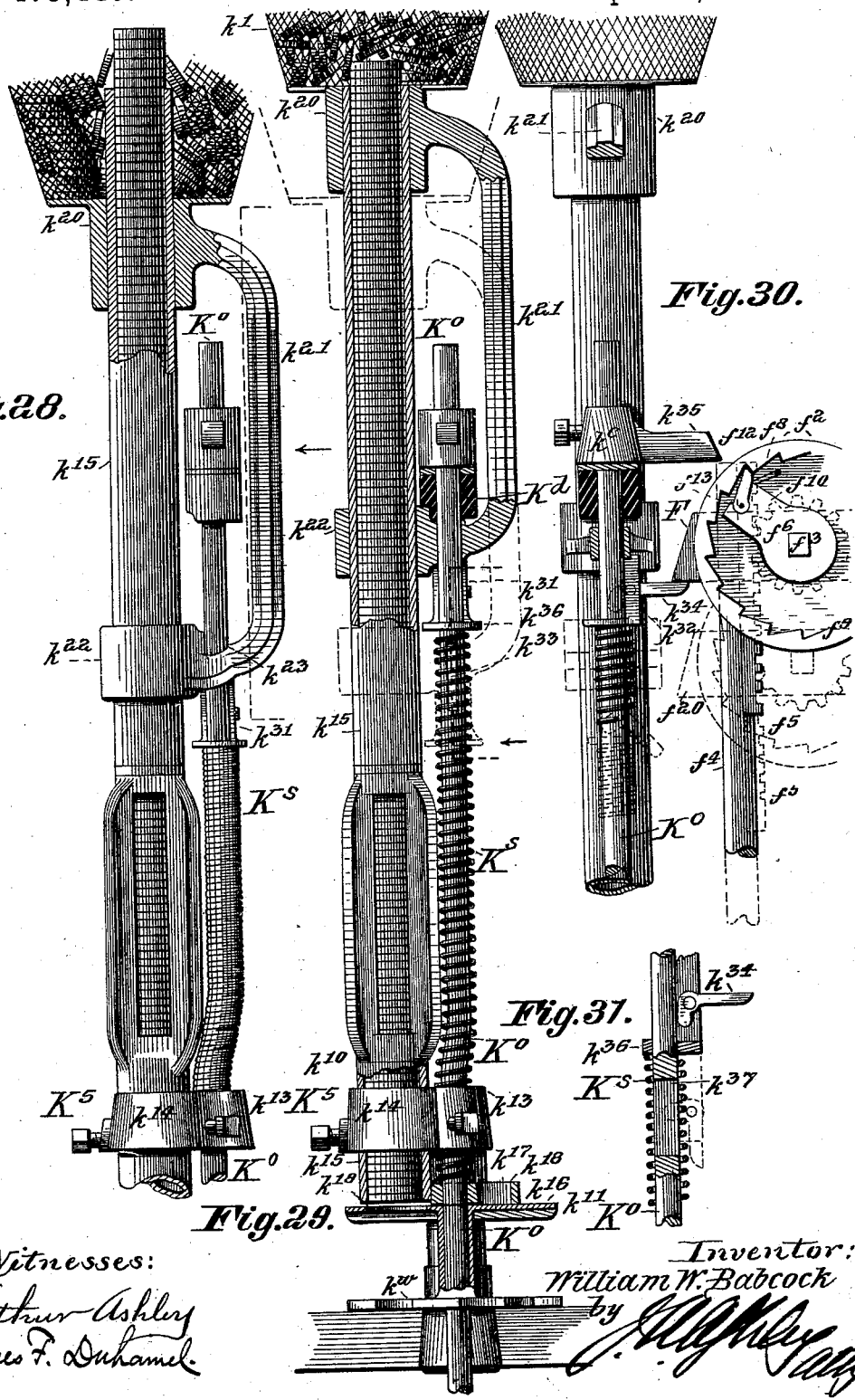

(No Model.) 16 Sheets—Sheet 14.
W. W. BABCOCK.
MACHINE FOR LOADING CARTRIDGE SHELLS.
No. 473,440. Patented Apr. 26, 1892.
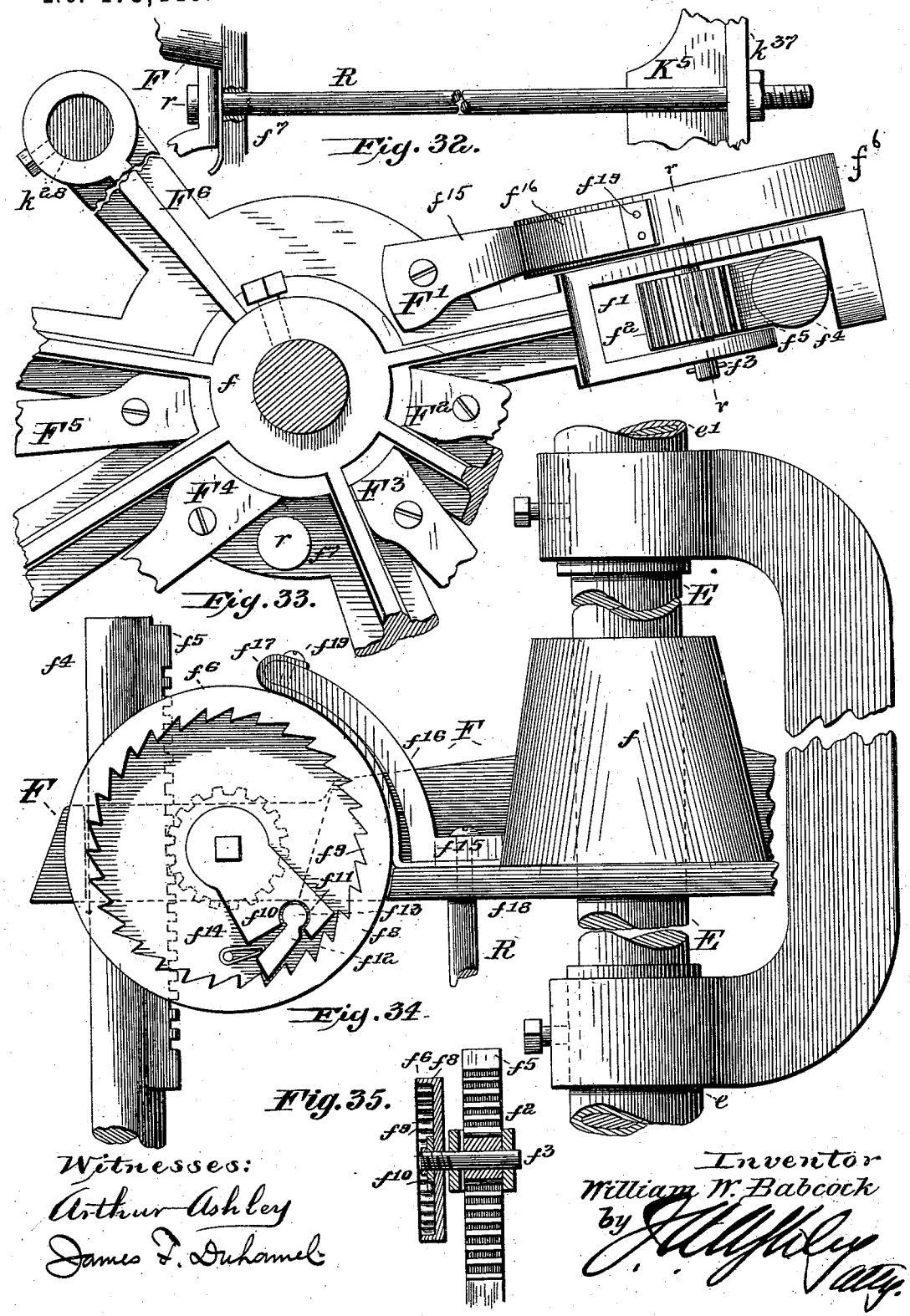
Witnesses:
Arthur Ashley
James F. Duhamel
Inventor
William W. Babcock
by [signature] Atty.

(No Model.) 16 Sheets—Sheet 15.
W. W. BABCOCK.
MACHINE FOR LOADING CARTRIDGE SHELLS.
No. 473,440. Patented Apr. 26, 1892.
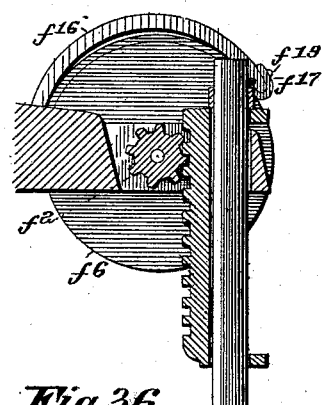
Fig. 36.
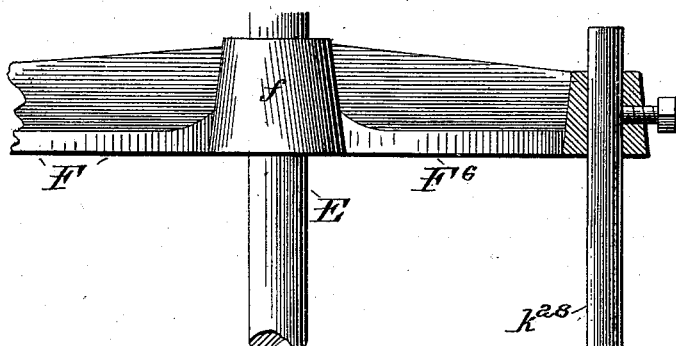
Fig. 38.
Fig. 39.
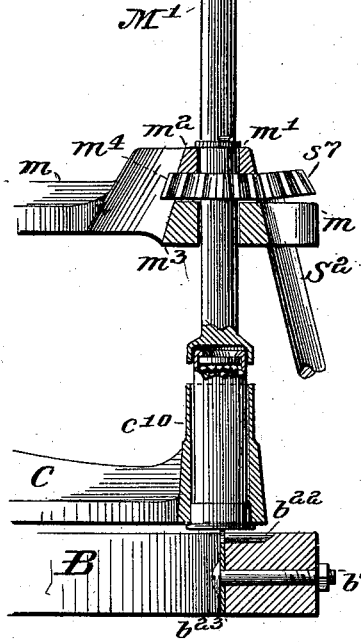
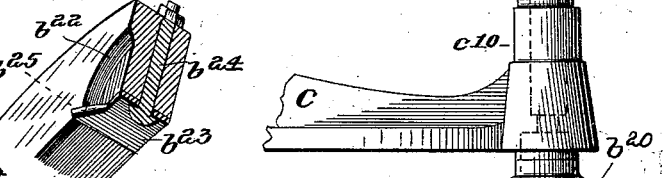
Fig. 41.
Fig. 37.
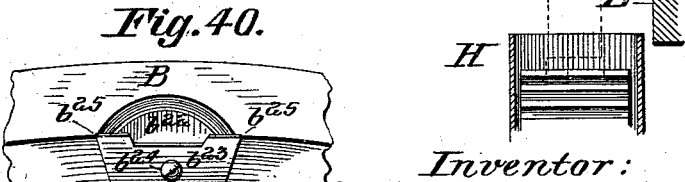
Fig. 40.
Witnesses:
Arthur Ashley
James F. Duhamel
Inventor:
William W. Babcock
by J. A. Ashley Atty.

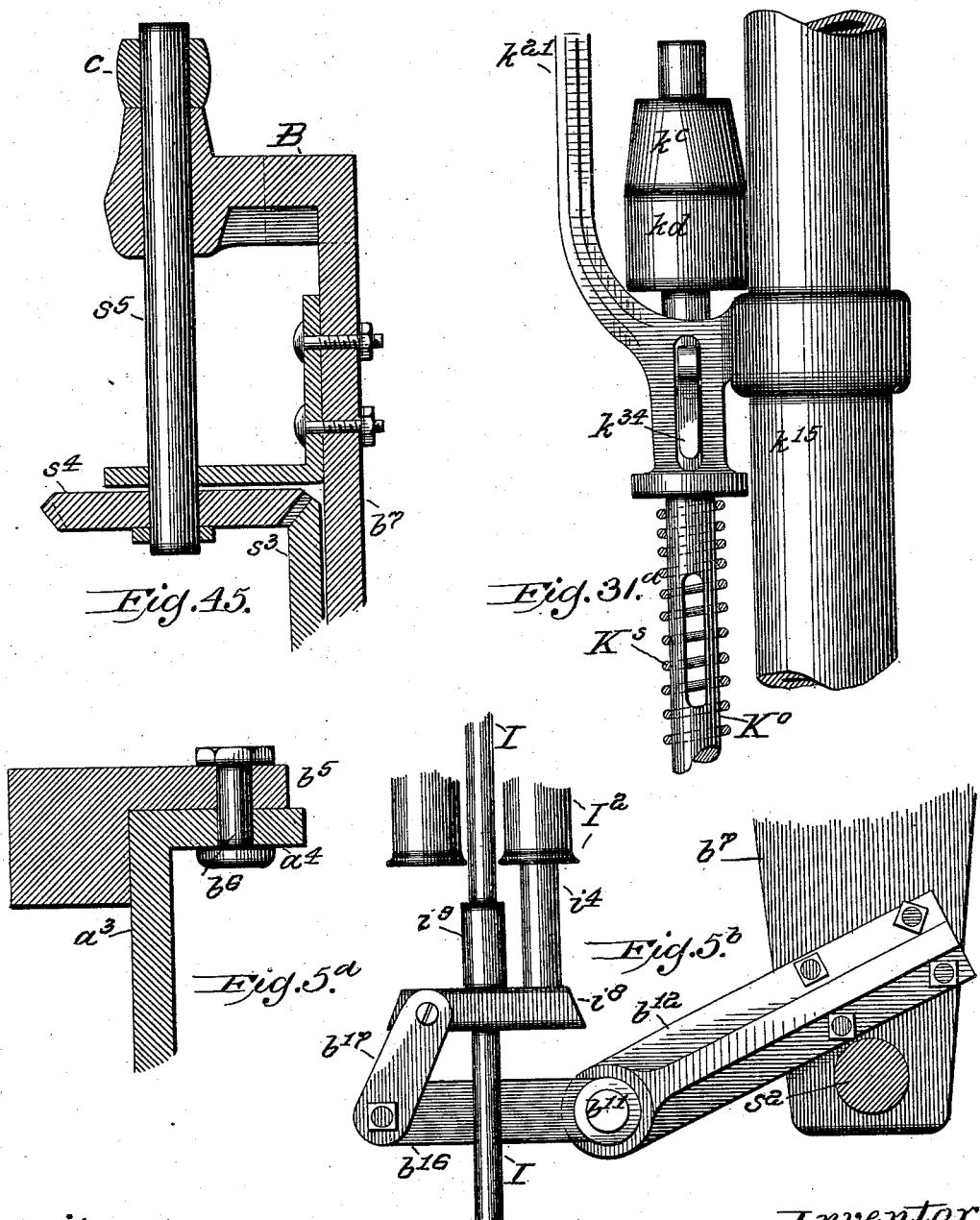

UNITED STATES PATENT OFFICE.

WILLIAM W. BABCOCK, OF GALESBURG, ILLINOIS.

MACHINE FOR LOADING CARTRIDGE-SHELLS.

SPECIFICATION forming part of Letters Patent No. 473,440, dated April 26, 1892.

Application filed October 8, 1890. Serial No. 367,436. (No model.)

*To all whom it may concern:*

Be it known that I, WILLIAM W. BABCOCK, a citizen of the United States, and a resident of the city of Galesburg, in the county of Knox, in the State of Illinois, have invented a new and useful Machine for Filling Cartridge-Shells, of which the following is a description.

The invention relates to and embodies various improvements in the class of machines which when actuated by any suitable power operate by successive steps to produce completed charges of fixed ammunition for use in fowling-pieces or other portable firearms; and the invention consists in the various novel constructions and combinations of elements which will first be described with particularity, and then specifically indicated in the concluding paragraphs of this specification.

Figure 2:
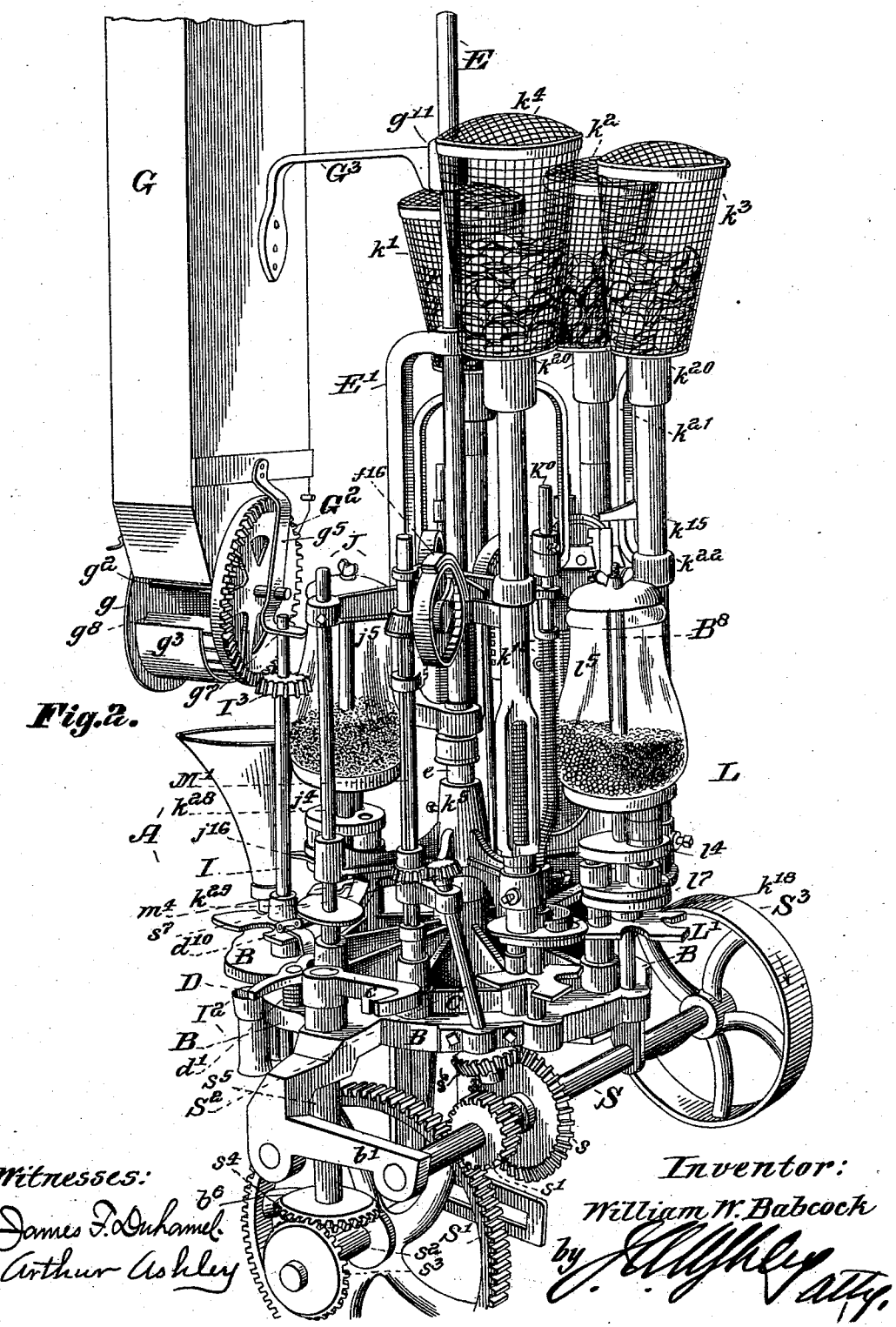
Figure 3:
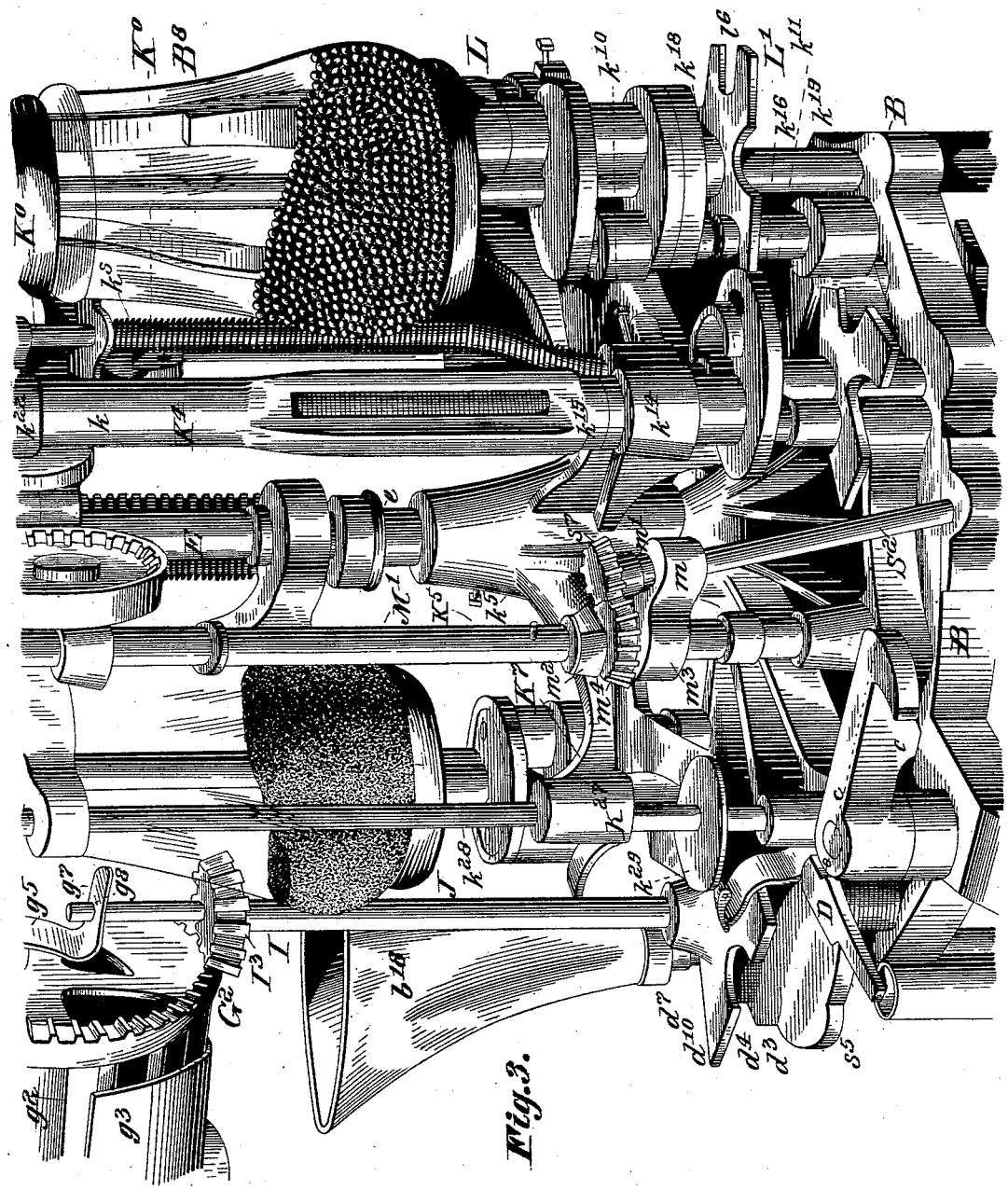
Figure 4:
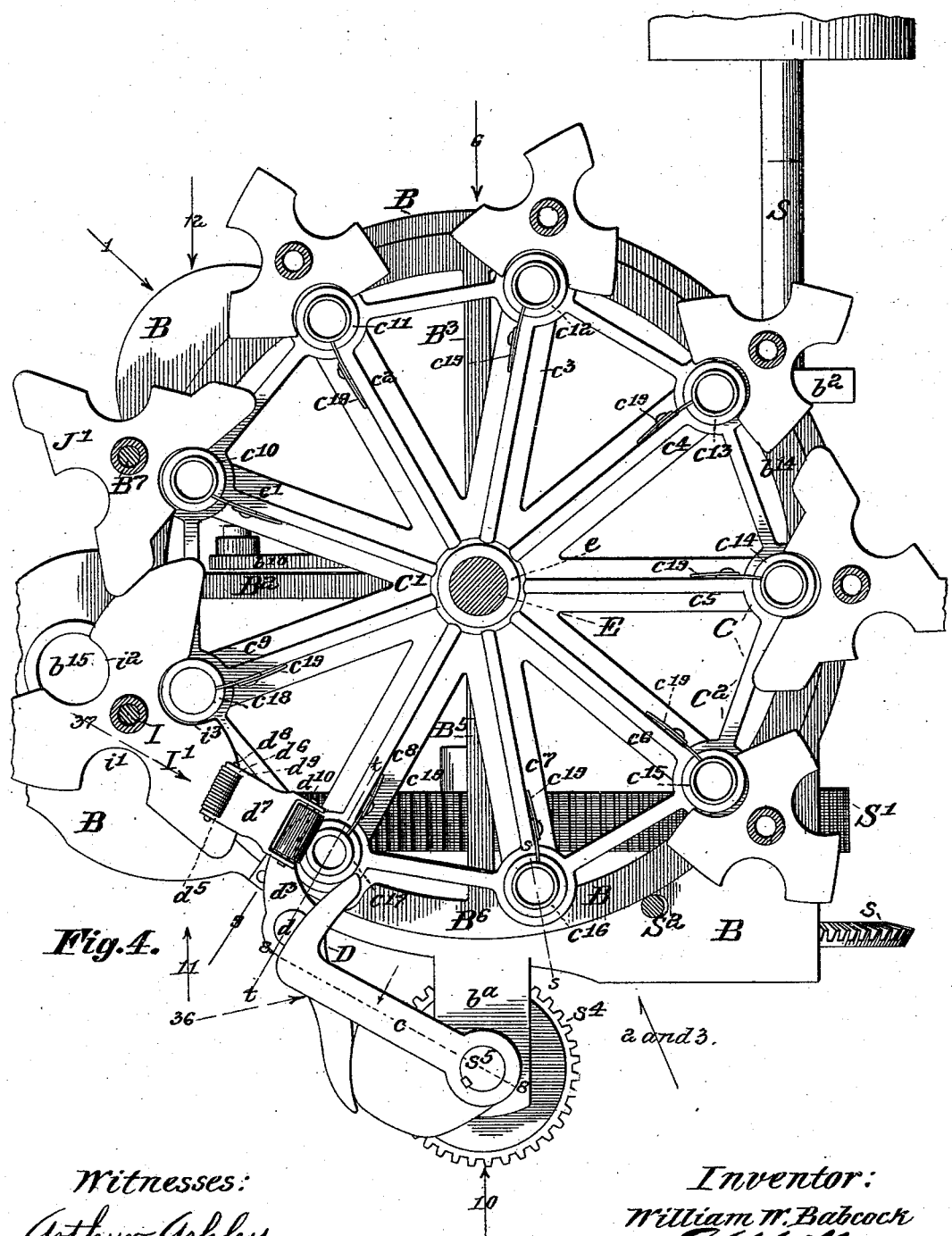
Figure 5:
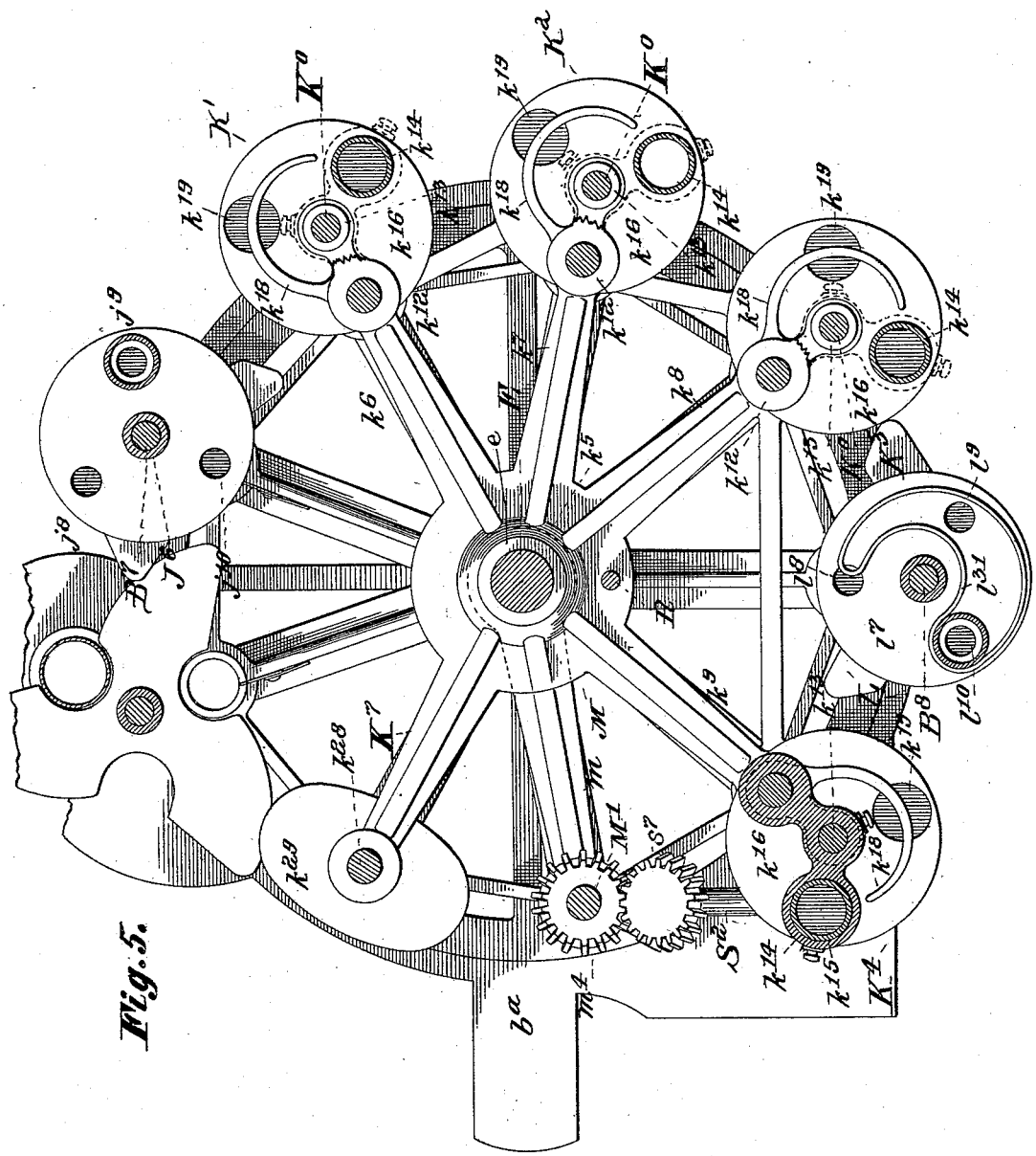
Figure 25:
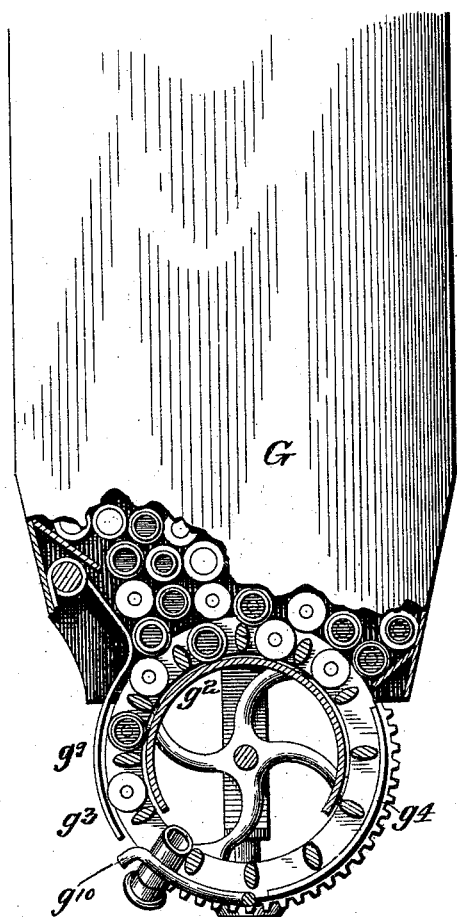
Figure 26:
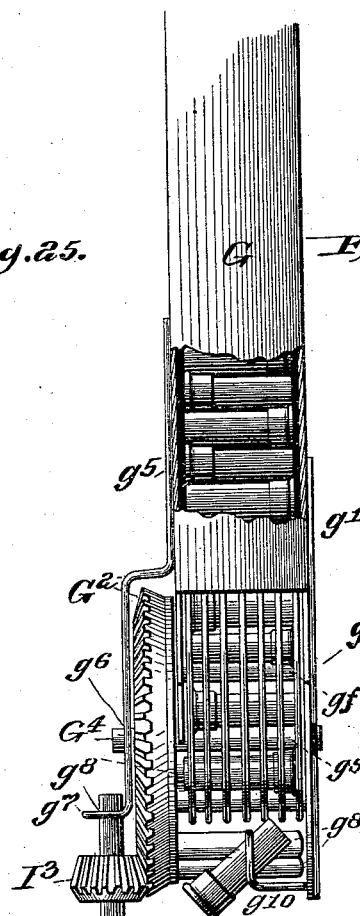
Figure 27:
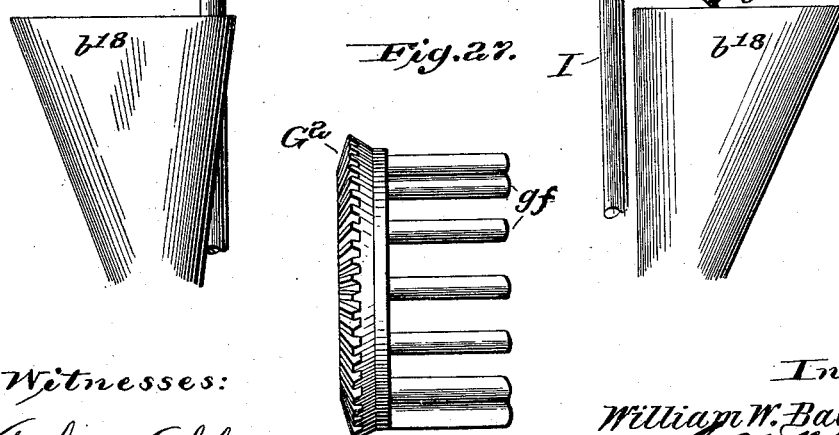

In the accompanying drawings, which constitute a part of this specification, Figure 1 represents a perspective elevation of the main upper portion of the machine, looking in the direction indicated by the double-barbed arrow 1 seen in Fig. 4. Fig. 2 is a partial perspective elevation looking in the direction indicated by the single-barbed arrow 2 represented in Fig. 4. Fig. 3 is a side perspective elevation of the central portion of the machine nearly as in Fig. 2, the parts being drawn to an enlarged scale. Fig. 4 is a horizontal plan view in the plane indicated at $u$ in Figs. 1 and 2. Fig. 5 is a horizontal plan in the plane indicated at $v$ in Fig. 1. Fig. 5$^a$, Sheet 16, is a detail showing the connection of the rear leg to the body of the bed-frame. Fig. 5$^b$, same sheet, is a detail of parts below the bed-frame. Fig. 6 represents a side elevation of the lower portion of the machine, looking in the direction of the arrow 6 in Fig. 4. Fig. 7 represents a side perspective view of the crimper-arm detached from its position upon the lower sleeve of the reciprocating main shaft. Fig. 8 is a detail, partly in section, in the line 8 of Figs. 3 and 4, showing the pivoted dog or stop in elevation. Fig. 9 is a vertical section in the line 9 of Fig. 4, representing the relation to the bed-frame and to the rotary shell-carrier of the depressible shell-supporting spring. Fig. 10 is a detail side elevation looking in the direction indicated by the arrow 10 in Fig. 4 and showing portions of the parts below the plane of the bed-frame. Fig. 11 is a detail side elevation, partly in central vertical section, of portions of the intermediate shell receiving and distributing mechanism. Fig. 12 is a detail side elevation looking in the direction shown by the arrow 12 seen in Fig. 4. Fig. 13 is a top plan view of the rotary three-part intermediate shell receiver and distributer. Fig. 14 is a side elevation of the intermediate rotary shell receiver and distributer. Fig. 15 is a view, mainly in vertical central section, of the powder-charging apparatus. Fig. 16 is a horizontal sectional plan in the line $x\,x$ in Fig. 15, showing the relation of the powder-discharging plates to two of the cylindrical shell receptacles or thimbles of the rotary shell-carrier. Fig. 17 represents another plan view of the parts seen in Fig. 16, the position of the same having been changed by the rotation of the shell-carrier. Fig. 17$^a$ represents a horizontal section in the line $y\,y$ of Fig. 15. Fig. 17$^b$ represents a horizontal section in the line $z$ of Fig. 15, the parts being drawn to a reduced scale. Fig. 18 represents a detail elevation, partly in central vertical section, of the shot-supplying reservoir and the subjacent parts whereby the shells are charged. Fig. 18$^a$ represents a detail vertical section of the primary receptacle or reservoir of the powder-supplying apparatus and its discharging-leg. Fig. 19 is a sectional plan view in the line 19 in Fig. 18. Fig. 20 is a sectional view in the line 20 in Fig. 18. Fig. 21 is a sectional plan view in the line 21 in Fig. 18. Fig. 22 is a detail vertical section, as in Fig. 18, the open leg or charging-tube being represented as filled with shot. Fig. 23 is a top plan view of the base for one of the wad-plates, being a portion of the outer extremity of an arm of the lower spider. Fig. 24 is a side view, partly in central vertical section, of the outer extremity of one of the arms of the lower spider, together with portions of the rotary shell-carrier, the bed-frame, and the wad supplying and forcing apparatus. Fig. 24$^a$ is a top plan view, and Fig. 24$^b$ is a side elevation, of one of the wad-plates and its integral star-wheel. Fig. 24$^c$ is a perspective plan view of one of the wad-holding arms detached, the figure being drawn to an enlarged scale. Fig. 25 is a front elevation, portions being broken out, of the primary shell receptacle or reservoir, its shell adjusting and discharging wheel, and the subjacent transferring hopper and chute through which the shells are precipitated and directed to the intermediate distributer. Fig. 26 represents a side elevation of the shell-conveying apparatus seen in Fig. 25, portions of the receptacle having been removed to show the course of the descending shells. Fig. 27 represents a side elevation of the gear and finger wheel detached. Fig. 28 represents a detail perspective elevation, partly in section, of one of the wad-hoppers, its tube, and other related parts. Fig. 29 represents a perspective sectional elevation similar to the view seen in Fig. 28, but showing the hopper in its elevated adjustment consequent on the action of the spring. Fig. 30 is a detail of the wad supplying mechanism in connection with portions of the wad-forcing mechanism, the view being at a right angle with that shown in Figs. 28 and 29 and looking in the direction of the arrow seen in the former figure. Fig. 31 is a detail sectional elevation of parts seen in Fig. 30, further illustrative of the operation of the tripping mechanism. Fig. 31$^a$, Sheet 16, is a detail elevation looking in the direction of the arrow in Fig. 31. Fig. 32 is a detail elevation showing the relation of the connecting and lifting rod to the upper and lower spiders. Fig. 33 is a detail top plan view of the upper spider, its arms, and portions of their related parts. Fig. 34 is a detail side elevation showing the reciprocating central shaft in connection with one of the arms of the upper spider, one of the wad-rammers, and one of the friction-wheels. Fig. 35 represents a vertical central transverse section in the line $r$ $r$ in Fig. 33. Fig. 36 is a detail side elevation, partly in vertical section, in the line $s$ $s$ in Fig. 4 and looking as indicated by the arrow 36 in that figure. Fig. 37 represents a detail side elevation, partly in vertical section, in the line $t$ $t$ in Fig. 4 and viewed as indicated by the arrow 37 in that figure. Fig. 38 is a detail plan of a portion of the bed-frame, showing the shell-recess seen in Fig. 36. Fig. 39 represents an elevation of the shell-holding plate which is seen in section in Fig. 36. Fig. 40 represents a detail perspective plan of bed-frame, showing the shell-recess and the edge-recessed shell-engaging plate. Fig. 41 represents a detail sectional perspective view of the bed-frame, the recess, and the shell-engaging plate. Fig. 42, Sheet 11, represents a detail side elevation of the shell-ejecting rod and the inking or shell-classifying mechanism employed in connection therewith, looking toward the central shaft of the apparatus. Fig. 43, same sheet, represents a detail sectional view of parts seen in Fig. 42 and looking in the direction of the arrow shown in that figure. Fig. 44 represents details of parts seen in Figs. 42 and 43, drawn to an enlarged scale. Fig. 45, Sheet 16, is a detail elevation of the double cam-lever.

The standard or pedestal $a$ of the machine A, Fig. 6, Sheet 6, is here represented as composed of three separate vertically-placed supports $a'$, Fig. 10, and $a^2$ $a^3$, Fig. 6, which are preferably rigidly connected together at a point between the floor and the bed-plate or base of the machine; but such standard may be of other suitable construction, if desired. At the front of the machine (see Fig. 2) the supports $a'$ $a^2$ are secured by bolts or by other suitable means to stout depending lugs or hangers $b'$ $b^2$, which are formed with the bed-plate or base B of the machine, Figs. 1, 2, 3, 4, 6, 10, 15, 18, and 24, while at the rear (see Fig. 5$^a$, Sheet 16) the third support $a^3$, which has a top outwardly-extending flange $a^4$, is secured by a bolt $b^6$ to a corresponding horizontal projection or outward continuation $b^5$ of the bed-plate. Extending horizontally through the two coincident lugs or hangers $b'$ $b^2$, Fig. 2, of the supporting-ring or bed-plate B and through the corresponding portion of the supports $a'$ and $a^2$ is the power-shaft S, Fig. 2, Sheet 2, and Fig. 10, Sheet 7, which at its outer extremity is provided with pulley or band-wheel $S^3$, Fig. 2, and which near its opposite extremity and beneath the bed-plate (see Figs. 4 and 6) is provided with a bevel gear-wheel $s$, and at a short distance therefrom with a smaller cog-wheel $s'$, Fig. 6, which engages the larger wheel $S'$, the horizontal shaft $s^2$ of which is journaled in bearings which are provided in central or interior hangers $b^7$ $b^7$, Fig. 6, which are formed with the base or bed-frame B and extend downwardly therefrom. Instead of this arrangement of the wheels $S'$, $s$, and $s'$, they may, if desired, be arranged upon the power-shaft S in the manner represented in Fig. 2 without affecting the operation of their related parts. At its outer extremity the shaft $s^2$ of the wheel $S'$, Fig. 6, is provided with bevel-wheel $s^3$, which engages the horizontal bevel-wheel $s^4$ upon the lower extremity of the shaft $s^5$ of the cam-lever $c$, Figs. 2, 4, and 8. The wheel $s$ upon the shaft S meshes with the wheel $s^6$, which is fixed upon the lower extremity of the short shaft $S^2$, which, extending obliquely upward through an inclined passage in the bed-plate, and through an opening $m'$ within the arm $m$ of the crimper-rod M', Figs. 2, 3, 5, and 36, is provided at its upper extremity with a slightly-beveled gear-wheel or pinion $s^7$. (Best seen in Figs. 2 and 36.) Upon the opposite or inner extremity of the shaft $s^2$, Fig. 6, of the wheel $S'$ is fixed an arm $b^8$, which at its outer extremity is provided with a laterally-extending pin $b^9$, which is received within the horizontally and laterally slotted head $e^2$ of the central vertical reciprocating shaft E of the machine and within the corresponding opening of the similarly-shaped lever $b^{10}$, which is received upon the outer extremity of the short horizontal shaft $b^{11}$, which is journaled in a bearing-arm $b^{12}$, Fig. 5$^b$, which is by its opposite end rigidly secured upon the opposite side of the inner hanger $b^7$ of the bed-frame, the shaft $b^{11}$ being provided at its opposite extremity with a rigidly-attached rearwardly-extending arm $b^{16}$, which at its base is sleeved and is keyed upon the shaft $b^{11}$, thereby forming in effect a continuation of the lever $b^{10}$. (See Figs. 6, 10, 11, and 12.)

As best seen in the plan view, Fig. 4, and in the side view, Fig. 6, the base-plate or bed-frame B is in plan somewhat of the form of a wheel, being provided with a central hub B′, which has a central vertical opening $b^{13}$, Fig. 4, for the reciprocating shaft E and its sleeve $e$, and with divergent strengthening-arms $B^2$, $B^3$, $B^4$, and $B^5$, which connect the hub with the body or rim $B^6$ of the plate, the upper surface of the arms being in a plane slightly below the top surface of such body or rim. Pivotally received upon the lower sleeve $e$ of the reciprocating central shaft E and resting upon the bed-plate B is the rotary shell-carrier C, Figs. 1, 2, 4, 12, 16, 17, 18, 24, 28, 36, 37, 42, and 43, which consists of a central hub C′, a rim $C^2$, and a series of intermediate connecting-arms $c'$, $c^2$, $c^3$, $c^4$, $c^5$, $c^6$, $c^7$, $c^8$, and $c^9$, which terminate outwardly in vertical cylindrical cells or open thimbles $c^{10}$, $c^{11}$, $c^{12}$, $c^{13}$, $c^{14}$, $c^{15}$, $c^{16}$, $c^{17}$, and $c^{18}$, which each have an inwardly-projecting holding-spring $c^{19}$ (see Fig. 4) and which at their base partially overlap and rest upon the inner edge of the rim $B^6$ of the bed-plate, which may, if desired, be provided with a recessed way $b^{14}$ to furnish a uniform and even bearing for the carrier, as seen in same figure. At its rear and at or near its longitudinal center the bed-plate has a vertical passage $b^{15}$, Fig. 4, of a diameter slightly greater than the caliber of the cells or thimbles $c^{10}$ $c^{11}$, &c., at the end of the connecting-arms of the shell-carrier, and it has also a smaller opening, in which is received a vertical shaft I, Figs. 4, 6, 10, 11, and 12, which extends to a considerable distance below the bed-frame and which at its foot may be suitably secured in a fixed portion of the machine. Immediately above the bed-plate the shaft I is provided with a primary three-point star-wheel I′, Figs. 4 and 11, which has suitable engaging-recesses $i'$, $i^2$, and $i^3$, while immediately below the bed-plate such shaft I is provided with the shell receiver and placer $I^2$, Figs. 4, 11, 12, 13, and 14, which consists of a top frame $i^4$, having a central opening for the vertical shaft I and depending equidistant cylindrical receptacles $i^5$, $i^6$, and $i^7$, each having at bottom a stop $i°$, and which has also upon its upper portion a pinion $I^3$, the star-wheel I′, the shell-receiver $I^2$, and the pinion $I^3$ being rigidly secured upon the shaft. Below the shell-receiver $I^2$ is a plunger $I^4$, Figs. 6, 10, 11, and 12, which consists of a base $i^8$, a central cylindrical sleeve $i^9$, which rises vertically from the base and encircles the body of the shaft I, and the plunger-rod $i^{10}$, which also is rigidly fixed upon the base at its inner extremity and rises vertically therefrom. At its outer extremity the base $i^8$ of the plunger is connected by a toggle-arm $b^{17}$ with the rear arm $b^{16}$ of the pivoted lever $b^{10}$, already described.

Suitably supported upon the bed-frame or base B is a shell-hopper $b^{18}$, Figs. 1, 2, 3, 11, 25, and 26, the discharging-neck $b^{19}$ of which is coincident with the vertical passage $b^{15}$ in such base. Secured in a vertical opening in the bed-frame, at a short distance from the passage $b^{19}$ in the same, in a position just outside the path of the rotary shell-carrier and extending upwardly from such frame, is a vertical rod $B^7$, concentrically upon which is a secondary star-wheel J′, which constitutes a part of and forms a base for the powder-distributing apparatus J, Figs. 1, 15, 16, 17, $17^a$, and $17^b$. The wheel J′ has bearing upon a suitable sleeve $j$, which rests upon the bed-frame, and it is arranged in a plane somewhat above that of the initial or primary star-wheel I′ upon the shaft I and a short distance above the plane of the upper extremity of the cells $c^{10}$ $c^{11}$, &c., upon the rotary shell-carrier C.

The powder charging and distributing apparatus J, Fig. 15, is mounted centrally upon a vertical rod $B^7$, which at its foot is received in a perforation in the body of the bed-frame B and is secured by a pinch-screw $p$.

Immediately above the upper surface of the bed-frame the rod $B^7$ receives a loose sleeve $j$, Fig. 15, upon which rests the star-wheel J′, which in the operation of the machine engages with the shells in the thimbles or cylinders $c^{10}$, &c., of the rotary carrier C. Formed with the star-wheel J′ is the cylindrical standard or supporting-hub $j^6$, with which in turn is formed the circular discharging-plate $j^7$, which has equidistant powder-discharging openings $j^8$, $j^9$, and $j^{10}$, which are concentric with the axis of the rod or shaft $B^7$ and which by preference are provided with short downwardly-indrawn depending continuations $j^{11}$. Rising from the center of the discharging-plate $j^7$ is a hub or shank $j^8$, upon which are placed, first, the stop-disk or cut-off plate $j^2$, which has a peripheral arm $j^{16}$, a central circular-opening $j^{14}$, and a single powder-discharging opening $j^{15}$; next, a circular plate or section $j^3$, which has a rectangular central opening and upwardly-extending sockets or short cylinders $j^{17}$, $j^{18}$, and $j^{19}$; third, a circular open disk or flattened ring $j^{26}$, and, lastly, a spiral spring $j^{29}$, which encircles the central rod and rests upon the disk. Upon the discharging section or plate $j^3$ and upon the spring $j^{29}$ is placed the receiving-plate $j^4$, which has downwardly-extending tubes or thimbles $j^{20}$, $j^{21}$, and $j^{22}$, Fig. $17^a$, which are received within the corresponding cylinders or sockets $j^{17}$, $j^{18}$, and $j^{19}$ upon the plate $j^3$, and which has also a central top sleeve $j^{31}$. Above the receiving-plate $j^4$ is the primary receptacle $j^5$, which has central bottom openings $j^{26}$, an eccentric discharging opening and leg $j^{27}$, an interior rod-encircling sleeve $j^{32}$, and an adjusting-nut $j^{30}$, which engages the threaded upper extremity of the central bearing-rod $B^7$.

The wad-supplying apparatus K (seen in Figs. 1, 2, and 3, but best represented in Figs. 24, 28, 29, 30, and 31) embraces the separate but essentially similar parts or divisions $K'$, $K^2$, $K^3$, and $K^4$, Figs. 1 and 24, which are supported upon a spider $K^5$, Figs. 24 and 28, the hub $k^5$ of which encircles the lower sleeve $e$ of the reciprocating central shaft E, Figs. 3 and 5, of the machine at a point immediately above the ring or hub M of the crimper-supporting arm $m$. The arms $k^6$, $k^7$, $k^8$, and $k^9$ of the spider, diverging from the hub $k^5$ in the manner shown, are in their outer portion provided with or divided into upper and lower bearings $k^{10}$ and $k^{11}$, Figs. 3 and 24, the upper bearing $k^{10}$ being divided into or provided with an inner thimble $k^{12}$, which has a vertical cylindrical passage, which receives the lower portion of one of the wad-rammers, a central portion $k^{13}$, which has a vertical opening to receive the lower extremity of the rod $K^\circ$ of one of the upwardly-thrusting springs $K^s$, and an outer portion or cylindrical thimble $k^{14}$, which has a larger vertical opening, within which is received and adjustably secured the cylindrical lower extremity of one of the wad-tubes $k^{15}$. The lower bearing $k^{11}$ of the spider-arms has a wad-opening $w^\circ$, Fig. 23, and a lateral recess $k^r$, which extends from its center outwardly, as seen in Fig. 23, by which the wad-plate $k^{16}$ and its star-wheel $k^w$, Figs. $24^a$ and $24^b$, which are integral with the vertical connecting-tube $k^t$, are centrally received upon such bearing and upon the spring-wound rod $K^\circ$. Upon the wad-plate is received a holding-arm $k^{18}$, Fig. $24^c$, which has a hub $k^{17}$ and a hub $k^\circ$, the former being coincident with the thimble or passage $k^{12}$ and the latter with the thimble or passage $k^{13}$. The arm extends horizontally along the surface of the wad-plate $k^{16}$ and closely overlies one of the three wad-openings $k^{19}$ in such wad-plate. At their upper extremities the wad-tubes $k^{15}$ are each surmounted by a hopper, as $k'$, $k^2$, $k^3$, and $k^4$, (see Figs. 1, 2, 28, 29, and 30,) which has an indrawn bottom continuation or extension $k^{20}$, which is adapted to encircle the body of the wad-tube proper and which is connected by a downwardly-extending arm $k^{21}$ with a second short sleeve or tube-encircling ring $k^{22}$, which at the junction of these parts is provided with a vertical cylindrical opening $k^{23}$, which receives the body of the rod $K^\circ$ of the spring $K^s$. (See Figs. 28 and 29.) Behind the fourth tube (the part or division $K^4$) and extending outward from its sleeve-encircling ring or hub M is the arm $m$ of the crimper-rod $M'$, Figs. 3, 5, and 36, which arm terminates outwardly in upper and lower jaws $m^2$ and $m^3$, each of which has a vertical opening $m'$, in which is received the lower portion of the end-recessed crimper-rod $M'$ and between which is the pinion $m^4$ upon such rod, which for rotary actuation thereof is engaged by the gear-wheel or pinion $s^7$ upon the shaft $S^2$, already described in connection with the description of the base-plate or bed-frame B. Behind the crimper-arm $m$ is a sixth arm $K^7$, (see Fig. 37,) which in its outer portion terminates above in a vertical open cylinder $k^{27}$, in which is received the lower portion of the ejecting-rod $k^{28}$, and below in a horizontal plate $k^{29}$, which has a central opening $k^{30}$, through which, also, the ejecting-rod $k^{28}$ is adapted to be extended.

At a point coincident with the arm $m$, which carries the crimper-rod $M'$, the bed-frame B is provided in its inner face with a vertical recess $b^{21}$, which is tapered at its ends from its top downwardly to the bottom, and upon its top with a shallow downwardly-tapered semicircular horizontal recess $b^{22}$, which outwardly unites with the vertical recess $b^{21}$. (See Figs. 38, 39, 40, and 41.) Within the recess $b^{21}$ is fitted a holding-plate $b^{23}$, which is secured to the bed-frame by a through-bolt $b^{24}$. The upper extremity of the holding-plate is cut away or recessed in its middle portion, while its ends $b^{25}$, which project slightly above the plane of the bed-frame, are beveled to a sharp edge for such engagement with the rim of the shell as will prevent its rotation under the torsional action of the crimping-rod.

Upon the edge of the bed-frame B, as seen in the general views, Figs. 2, 3, and 4, and in detail in Figs. 10, 42, 43, and 44, behind the projecting arms $b^a$ and $b^c$, which receive the revoluble shaft $s^5$ of the double cam-lever $c$, and between it and the transverse center of the rear portion of the bed-frame, is pivotally mounted the dog D, the post $d$ of which is encircled by a spiral spring $d'$, which operates normally to force the short arm $d^3$ of the dog inwardly within the field of rotation of the shell-carrier and into contact with the particular cell or shell-cylinder which at the moment chances to be at the rear of the body of the cam-lever. Upon the inner extremity or short arm $d^3$ of the dog (see Figs. 4, 42, 43, and 44) is mounted a preferably slightly-flexible support $d^4$, which at its upper extremity has bifurcations or upturned ears $d^5$ $d^6$, within which are received the pivot-pin $d^8$ and the spring-coil $d^9$ of a secondary support or lever-arm $d^7$, upon which at its outer extremity is received an inking-roller $d^{10}$, which operates in connection with any suitable die which is provided in the lower extremity of the ejecting-rod $k^{28}$, (see Fig. 37,) above described.

It will be understood that through the operation of the spring-coil $d^9$ the lever-arm $d^7$, which at its free extremity carries the inking-roller $d^{10}$, is forcibly held in the position indicated by the dotted lines in Fig. 42 and that at regular intervals at each inward movement of the shorter arm of the dog D simultaneously with the descent of the ejecting-rod $k^{28}$ the roller previously inked will be moved across the lower extremity of such rod, and will thus supply ink to the letter, number, or other character provided thereon.

At the base of the pivot-post $d$ of the dog D, in a top recess which extends transversely of the body or rim $B^6$ of the bed-frame, is secured a flexible spring-support $b^{20}$, (see Figs.

9 and 37,) which projects inwardly in a horizontal plane to a distance about equal to the extent transversely of the horizontally-recessed portion of the body of the bed-frame itself.

The shot-supplying apparatus or charger L (Figs. 18, 19, 20, 21, and 22) is in its main features precisely similar to the powder-distributing apparatus J; but for convenience of reference its parts are designated by different letters, and it may therefore be separately described. At its center is the vertical supporting-rod $B^8$, secured by its lower extremity in the body of the bed-frame at a point between the wad-supplying sections or columns $K^3$ and $K^4$. Encircling the body of the rod $B^8$ and resting upon the bed-frame is a sleeve $l$, upon which is received the star-wheel $L'$, which is formed with a central supporting standard or hub $l^6$, from the wall of which extends horizontally outward a circular flange-like plate $l^7$, which is provided with equidistant openings $l^8$, $l^9$, and $l^{10}$, which are concentric with the axis of the rod $B^8$ and which may have below the plate $l^7$ short tubular or indrawn downwardly-extending continuations $l^{11}$. Immediately above the plane of the plate $l^7$ the standard or hub $l^6$, which is squared, receives by its central circular opening $l^{14}$ the circular stop-disk or cut-off plate $l^2$, which is thus fixed upon such standard or hub. Besides its central opening $l^{14}$ the cut-off plate has near its outer edge a single discharging-opening $l^{15}$, which is in the same vertical curvilinear plane as are the several openings $l^8$, $l^9$, and $l^{10}$ in the plate $l^7$, and it has also an outwardly-projecting downwardly-curved operating and contact arm $l^{16}$. Fitted upon the upper extremity of the hub $l^6$ is the measuring and charging section $l^3$, the lower member $l\,m$ of which has upwardly-extending sockets or cylinders $l^{17}$, $l^{18}$, and $l^{19}$, which loosely receive the coincident downwardly-extending thimbles or passages $l^{20}$, $l^{21}$, and $l^{22}$ of the upper member $l^4$, such thimbles being continuous of the openings $l^{23}$, $l^{24}$, and $l^{25}$, which extend through the body of such upper member or receiving-plate. The reservoir or primary receptacle $l^5$ is received by its central opening $l^{26}$ and by its rod-sleeve $l^{32}$ upon the vertical rod $B^8$, and at its foot it is at one side provided with an open tubular discharging-leg $l^{27}$, which may either rest upon or terminate a short distance above the receiving-plate $l^4$. Upon the upper extremity of the supporting-hub $l^6$ is an annular disk $l^{28}$, which is received upon the supporting-rod $B^8$ and serves as a base for a spiral spring $l^{29}$, which is compressed between it and the flat bottom of the superposed plate $l^4$. At its upper extremity the supporting-rod $B^8$ is threaded for the reception of a wing-nut $l^{30}$, which engages the cover of the receptacle and by the use of which, in connection with the coiled spring $l^{29}$, the quantity of shot which it is desired to supply to each shell may be changed and regulated at pleasure, the spring between the upper and lower members of the charging-section $l^3$ operating when the wing-nut is moved upwardly to force the upper member or receiving-plate of the intersleeved sections in the same direction, and thus increase the vertical extent of the cylindrical passage in which the charges are measured. Upon the receiving-plate $l^4$ is provided a directing way or guide $l^{31}$, Fig. 19, which is so curved as to extend along the surface of the plate exterior and in close proximity to the shot-discharging openings $l^{23}$, $l^{24}$, and $l^{25}$ in the same and serves to prevent any of the shot which may fall upon the plate outside the shot-opening for which they are intended from rolling off the plate and falling to the floor.

The upper spider F, Figs. 1, 30, 32, 33, 34, 35, 36, and 37, embraces a central hub $f$ and arms $F'$, $F^2$, $F^3$, $F^4$, and $F^5$, which radiate therefrom in the manner seen in Fig. 33, and has vertical movement between the lower sleeve $e$ and the upper sleeve $e'$ upon the central main shaft E of the machine. These arms each have an outer vertical slot or recess $f'$, Fig. 33, the walls of which have coincident bearings, in which is received the shaft $f^3$ of an intermediate toothed wheel $f^2$, which engages a rack-bar $f^5$, Figs. 33 and 34, which is formed with or secured upon the inner face of one of the vertically-placed wad-rammers $f^4$, and also with the crimper-rod M'. That end of the shaft $f^3$ of the wheel $f^2$ which has bearing in the longer wall or bifurcation of the arm extends outward beyond such wall or slotted portion to a distance sufficient to permit it to receive a ratchet friction-wheel $f^6$ and its pawl-carrying arm $f^{10}$, Fig. 34. Upon the side contiguous to the arm upon which it is supported the friction-wheel has a plain flat surface; but upon the opposite side it has along its periphery a continuous rim $f^8$, upon the inner face of which are formed the series of ratchet-teeth $f^9$, as shown. The arm $f^{10}$ (best seen in Fig. 34) has in its inner face a circular recess $f^{11}$, in which is received the pivot pin or post $f^{13}$ of a pawl $f^{12}$, the opposite extremity of which engages the ratchet-wheel, and it has also a recess which receives one portion of a spring $f^{14}$, which outwardly bears against the pawl and maintains it in position. The toothed wheel $f^2$ and the pawl-carrying arm $f^{10}$ are rigidly keyed upon the shaft $f^3$; but the friction-wheel is revoluble upon such shaft. Mounted upon a flange or connecting-web $f^{15}$ at the junction of the arm with its hub is a curved friction-bar $f^{16}$, which, together with its coincident friction-band $f^{17}$, which is preferably composed of a strip of stout leather, is secured by means of an adjusting-screw $f^{18}$, the upper portion of the band being connected to the bar by means of a screw or by suitable hooks or pins $f^{19}$, and the bar and the band together acting to render the friction equal upon all parts of the face of the wheel. The arm $F^6$ of the spider F (see Fig. 33) is provided only with an opening to receive the ejecting-rod $k^{28}$, as before described.

Upon the lower encircling ring or sleeve $k^{22}$ of each of the wad-supplying sections or divisions K', $K^2$, $K^3$, and $K^4$ is a smaller outwardly and downwardly extending sleeve or cylinder $k^{31}$, (see Figs. 28 and 29,) which receives the upper portion of the spring-carrying rod $K^o$ and which at its lower extremity has a flange bearing or stop $k^{36}$, against which abuts the upper extremity of the spring-coil $K^s$. The sleeve or cylinder $k^{31}$ has upon its inner side a flattened surface $k^{32}$, in which is a vertical slot $k^{33}$, in the walls of which is pivoted a two-armed or elbowed tripping-dog $k^{34}$. The spring-carrying rod $K^o$ is also provided with a slot $k^{37}$, Fig. 31, corresponding with the slot $k^{33}$, Fig. 29, in the sleeve $k^{31}$, into which when the spring is depressed, as in Fig. 31, the short arm of the tripping-dog $k^{34}$, Figs. 30 and 31, is moved by the greater weight of the outer and longer arm, which at the same time falls wholly within the opening of its slot, and thus permits the spring to force its hopper upward. Upon the upper extremity of the spring-carrying rod $K^o$ is provided a thimble or collar $k^c$, which rests upon an encircling rubber buffer $k^d$ and which has an inwardly-projecting horizontal arm $k^{35}$, Fig. 30, which directly overhangs the shaft of the wad-rammer $f^4$, while the tripping-dog $k^{34}$ is in the vertical path of the downwardly-sloping outer extremity $f^{20}$ of the wheel-bearing spider-arms F', $F^2$, $F^3$, or $F^4$.

The arm $k^{35}$ prevents the rammer $f^4$ from being moved too high through any failure of the ratchet-wheels $f^6$ to reverse freely, and the collar $k^c$ of such arm receives the shock of the upward thrust of the wad-hoppers and retains the same in position, so that the dog $k^{34}$ will be engaged by the outer extremity $k^{20}$ of the several arms of the spider at the beginning of its movement downward.

As will be seen in Figs. 5, 32, and 34, a lifting-rod R, the lower extremity of which is fixed in an intermediate flange or web $k^{37}$ of the lower spider $K^5$, extends vertically upward through and is loosely received in an opening in one of the similar webs $f^7$ in the upper spider F. At its upper end the rod has a lateral flange or cap $r$, which in operation bears against the top of its web $f^7$, as will be explained. This rod may be applied either just in rear of the shot-receptacle $l^5$, as shown, or at the opposite side of the spider near the arm $F^6$ of the ejecting-rod $k^{28}$; or, if desired, such a rod may be provided at each of these points.

The shell receptacle and discharger, Figs. 2, 25, 26, and 27, consists of a case G, which is conveniently constructed of sheet metal and of any suitable dimensions, but is necessarily of an interior extent from front to rear somewhat greater than the length of one of the shells. At its lower extremity its sides converge toward the center, and its rear plate has a downward extension $g$, which at its rear receives a vertically-extending bar $g'$, while upon its front surface are provided an upper segmental plate $g^2$ and lower segmental plates $g^3$ and $g^4$, Fig. 25. Upon the front of the case, near its lower extremity, is attached a downwardly-extending supporting-arm or angle-bar $g^5$, which at a point opposite the center of the downward extension $g$ has an opening $g^6$, while its lower extremity is bent outwardly at a right angle, forming an arm $g^7$, in which is an opening $g^8$. Upon a shaft $G^4$, which has bearing at its front in the opening $g^6$ of the bar $g^5$ and at its rear in a corresponding bearing-opening in the rear bar $g'$, is a bevel gear-wheel $G^2$, which upon its rear face is provided with a series of fingers $g^f$, which extend horizontally backward therefrom to a point near the rear plate of the case. The segmental plates $g^2$, $g^3$, and $g^4$ are so arranged that the circle of fingers $g^f$ are above or outside of the plate $g^2$ and are above and inside of the plates $g^3$ and $g^4$. The converging side at the right of the case is provided with a series of wires $g^9$, which permit observation of the interior, and a wire $g^{10}$ at the bottom is at about its mid-length outwardly bent to facilitate the discharge of the shells. An eye or ring $g^{11}$ upon the outer extremity of the arm $G^3$, Fig. 2, upon the front of the receptacle G is passed over the end of the shaft E of the machine and is secured upon the sleeve $e'$ above the upper extremity of the bent arm E', which connects such sleeve with the lower sleeve $e$, while by the opening $g^8$ in the short horizontal arm $g^7$ the vertical shaft I of the bed-frame B is engaged and the gear-wheel $G^2$ of the shell-discharger and the pinion $I^3$ upon the shaft I are maintained in their proper adjustment. (See Fig. 26.)

A suitable shell-discharging chute H, Figs. 6 and 10, is attached to the bottom surface of the bed-frame, being by preference received by its upper extremity upon the threaded lower extremity of the pivot-bolt $d$ of the intermittently-acting dog D. The discharging-chute may be so mounted as to overhang and to embrace by its flanges the rear portion of the wheel S', and its receiving-opening is in such relation to the upper portion of the wheel that the shells upon being discharged fall upon the outer face thereof and are carried rearwardly into the lower portion of the chute.

In the operation of the apparatus the ammunition-receptacles will be filled and the wad-feeding hoppers and their discharging-tubes will be supplied with the desired kinds of wads.

In supplying the shell-receptacle G by removing the original packing-cases the shells may be placed in the receptacle in a horizontal position in quantities of one hundred or more at once. By the actuation of the power-shaft the shells are moved downward in a horizontal position by the intermittently-rotating gear-faced finger-wheel until they reach the tilting bar or directing-wire $g^{10}$ at the mouth of the receptacle, when they fall headlong, or heavy and down, into the rotary shell-placer or intermediate carrier $I^2$.

As already indicated and as represented in the drawings, Fig. 15, Sheet 9, and Fig. 18, Sheet 10, the stop-disk or cut-off plate $j^2$ of the the powder-supplying apparatus J and the like disk or cut-off plate $l^2$ of the shot-supplying apparatus L remain fixed in position, their contact-arms $j^{16}$ and $l^{16}$ respectively engaging continually any suitable fixed portion of the machine. As thus adjusted a charge of ammunition is supplied at each rotation of the star-wheel of each charging apparatus.

As will have been noted in connection with Figs. 2, 7, 36, and 37 of the drawings, the recess in the end of the crimper-rod M′ is at its upper extremity slightly indrawn or diminished in diameter, so as in the operation of the machine to bear obliquely downward and inward against the periphery of the upper extremity of the shell. The pressure downward upon the rod by the friction-wheel upon the spider-arm and its rotation by the gear-wheels at the outer extremity of the crimper-arm combine to effectually crimp the shell—that is, to turn its body slightly inward and downward upon its closing-wad and to produce a smooth and hard finish upon the end of the shell.

The general operation of the machine will be apparent from the foregoing description of its construction. The spiders being in their lowest adjustment and the body of the cam-lever c overhanging and extending along the body of the pivoted stop or holding-dog D, upon backward actuation of the power-shaft S—that is, in the direction indicated by the arrow upon the band-wheel, Fig. 2—the cam-lever will be moved outwardly, and the plunger $I^4$ will at the same time be moved upwardly, pushing before it out of the intermediate shell-receptacle or rotary carrier $I^2$ and into one of the shell-receptacles, as $c^{10}$ $c^{11}$, &c., of the main rotary shell-carrier C above it one of the shells previously delivered into such secondary or intermediate shell-receptacle. The movement of the lever being continued, the plunger $I^4$ will be moved downwardly and its rod will be withdrawn from the receptacle from which the shell has just been expelled and transferred to the carrier C above it. The cam-lever c will meanwhile have been brought into engagement with the particular shell-receptacle which is next in succession. The reciprocating shaft E will have been moved upwardly, carrying with it the upper spider F, and near the close of its movement (through the medium of the connecting-rod) the lower spider $K^5$ also. The reciprocation of the lower spider is slight, but its movement upward is sufficient to elevate it above the plane of the shells in the rotary shell-carrier, and thus permit the further rotation of the carrier. The movement of the cam-lever being now a little further continued, the primary star-wheel I′ will be engaged and partly rotated by the next shell-receptacle of the main rotary carrier C, and upon such engagement the discharge of a shell from the mouth of the shell-reservoir G and the release of the spring-actuated dog D and the movement of its inking-roller $d^{10}$ inward across the face of the die upon the lower extremity of the ejecting-rod $k^{28}$ in the manner already described will simultaneously follow. In the further continuation of the movement the projecting upper extremity of the shell will engage and be engaged by the star-wheel J′ of the powder-supplying apparatus J and through the rotation of such wheel will be brought into coincidence with the discharge-opening of such apparatus and will receive its charge therefrom, after which it will be brought into contact with the star-wheel $k^w$ of the first wad-supplying hopper K′, and, the movement being continued, the star-wheel will cause rotation of its wad-plate through a partial revolution, bringing into coincidence with the shell the wad-opening next in order, when, the power-shaft having been continuously in motion, the spiders will have descended, the dog $k^{34}$ upon the sleeve of the wad-tube will have been tripped, causing through the action of the spring (thus made free to operate) a violent upward thrust of the wad-hopper and consequent agitation and redistribution of its contents, and the wad-rammer will have operated, through the actuation of the friction-wheel of the corresponding arm of the spider F, to force the wad downward to its position upon the powder. The revolution of the power-shaft being still continued, the reciprocating main shaft and its spiders will again be moved upward, and upon two repetitions of that portion of the operation which has already been described a shell in the rotary carrier coincident with each of the three divisions or wad-sections K′, $K^2$, and $K^3$ will have been supplied with powder and with a wad. The rotation of the carrier will now move the shell first above mentioned from its position coincident with section $K^3$ to its position under the shot-supplying apparatus L, in which, the cut-off opening having in the operation of the carrier been uncovered in the manner already explained, the predetermined quantity of shot will be discharged into the shell, which will next be brought into line with the proper wad-opening in the wad-division $K^4$, from which its second or closing wad will be received, the rammer of this division operating in the manner already described to press it into its position near the top of the shell. In the continuation of the operation the spiders will again be lifted, as before, and in the ensuing further rotation of the carrier the shell will be brought to its fifth station upon the bed-frame in a vertical line beneath the continually-projecting end of the crimper-rod M′, which in its downward movement, which now follows, and in its rotary movement, which is continuous, operates to effectually "crimp" by pressing inwardly and downward the upper extremity of the unfilled portion of the shell, as already set forth. In the further operation of the machine the central shaft and its spiders are again elevated and the rotation of the carrier is continued through another space, bringing the now completed cartridge into its sixth position above the bed-frame of the machine. In this position, it will be observed, it will have passed beyond the end of the curved margin of the inner periphery of the rim of the bed-frame, on which by its outer portion it has been supported during the above-described operation of charging, and into a position coincident with the recessed or cut-away portion $c^a$ of such bed-frame, and it will here be lightly but sufficiently supported by the top spring in the carrier-cylinder and upon the horizontal spring $b^{20}$, which extends inwardly from the bed-frame and overhangs the recess $c^a$. In the descent of the spiders, which will now occur, the horizontal spring will momentarily resist the action of the downwardly-moving ejecting-rod $k^{28}$, and in this interval the tip of the cartridge will receive the imprint of the just previously-inked die upon the end of the rod, and then under the impetus of the rod the resistance of the spring will be overcome and the cartridge will be ejected, the supporting-spring thereupon instantly returning to its original horizontal position.

It will be understood that the rotary carrier is stopped and firmly locked for a moment at the completion of each charging movement between the inner arm of the pivoted dog D and the upper face of the double cam-lever $c$, while the lower face of the cam-lever at the same time bears against the outer arm of such dog.

Ordinarily the shells will each receive three wads besides the closing-wad; but it will be apparent that by varying the adjustment of the parts a smaller number may be inserted.

The invention having been thus described, what is claimed is—

1. In a machine for filling cartridge-shells, a wad-supplying device consisting of a wad-containing tube having mounted upon its upper extremity a primary wad-supplying hopper, in combination with a tripping-dog and a spring which upon the engagement and release of the tripping-dog by the actuation of the machine will produce a violent movement of the hopper, and thereby cause a shifting of its contents and the discharge of its wads into the wad-holding tube, substantially as set forth.

2. In a machine for filling cartridge-shells, a wad holding and discharging tube, a primary wad-supplying hopper mounted upon the upper extremity of the wad containing and discharging tube, a wad-pushing plate at the base of the wad-holding tube, which operates to move the wads as they are received from the wad holding and discharging tube to the wad-starting opening, and a reciprocating wad-rammer which operates to force the wads through the wad-opening into the mouth of the shell below, substantially as described.

3. In a machine for filling cartridge-shells, an intermittently-operating wad receiving and discharging tube, upon the upper extremity of which is mounted a wad-containing hopper, combined with an upper and a lower vertically-reciprocating spider, the projecting arm of the upper spider carrying the wad-rammer and the corresponding arm of the lower spider having vertical openings which correspond, respectively, with the wad-discharging tube, with the wad-rammer, and with the guide-rod of the spring which actuates the tube and its hopper, and a wad-plate which rests upon the lower spider-arm, which has rotation in a horizontal plane and which has openings through which the wads are forced by the wad-rammer into the cartridge-shell, substantially as specified.

4. In a machine for filling cartridge-shells, an upper vertically-reciprocating spider which is provided with a projecting arm, and a wad receiving and discharging tube and a wad-rammer which are mounted in such projecting arm, combined with a lower spider which is provided with an arm which carries a rotating wad-plate which has wad-openings, a wad-pushing arm, and an opening for the wad-rammer, substantially as described and shown.

5. In a machine for filling cartridge-shells, the combination of a reciprocating wad-rammer, a wad-plate which is provided with a wad-starting opening which is coincident with the wad-rammer, a wad-pushing plate which operates to move the wads to the opening under the wad-rammer, and a wad-holding collar which nearly or quite encircles the lower extremity of the rammer, whereby a wad the diameter of which is greater than that of the wad-opening is held by its periphery in a horizontal position between the collar and the wad-opening, substantially as specified.

6. In a machine for filling cartridge-shells, an upper vertically-reciprocating spider which has an arm which carries a wad receiving and discharging tube and a wad-rammer, and a lower vertically-reciprocating spider which has an arm, at the outer extremity of which is received a wad receiving and discharging plate which has a series of wad-openings combined with an arm which is sleeved upon the lower extremity of the wad-rammer and which overlies one of the discharge-openings in the wad-plate, substantially as set forth.

7. In a machine for filling cartridge-shells, the combination, with a rotary carrier which is provided with a series of shell-receptacles, of a spider which in its projecting arms is provided with openings which receive the wads and which receive also the upper extremity of the cartridge-shells as they are brought into coincidence with the wad-rammers, the spider having reciprocation in a vertical plane, as described, so that in the operation of the machine the shells are alternately engaged and released, substantially as described.

8. In a machine for filling cartridge-shells, the wheel S', having shaft $s^2$ and carrying the arm $b^8$, provided with the pin $b^9$, the vertical reciprocating shaft E, having slotted horizontal head $e^2$, and the shaft $b^{11}$, carrying the arm $b^{10}$, slotted at its front and engaged by the crank-pin $b^9$ and extending backwardly at its rear and engaging the shell elevator or plunger, in combination.

9. In a machine for filling cartridge-shells, a fixed bed-frame having an outer rim or body, central open hub, and intermediate arms, a vertical sleeve in the central hub, a vertical reciprocating shaft within the sleeve, a rotary shell-carrier encircling the sleeve, and a crimper-arm received by one extremity upon the sleeve and provided at its opposite extremity with a vertical crimper-rod which is adapted to operate in connection with the rotary shell-carrier, in combination.

10. In a machine for filling cartridge-shells, a rotary shell-carrier which is actuated by the power-shaft, the power-shaft having an end gear-wheel, the crimper-actuating shaft engaged by such end gear-wheel, and the vertically-reciprocating crimper-rod which in the operation of the machine engages the shells in succession to crimp the same, in combination, as specified.

11. The upper spider F, having arm $F^5$, the vertical shaft E, the independent arm $m$ upon the vertical shaft, and the crimper-rod M', having vertical movement within the arms $F^5$ and $m$, in combination, substantially as and for the purposes set forth.

12. The reciprocating spider F, having arm $F^5$, the vertical shaft E, the non-reciprocating arm $m$ upon the shaft E, and the crimper-rod M', having pinion $m^4$ and mounted and having movement vertically in the arms $F^5$ and $m$, combined with the shaft $S^2$, having bevel-wheel $s^7$ and actuated by the power-shaft S, substantially as and for the purposes specified.

13. In a machine for filling cartridge-shells, the crimper-rod M', having rack-bar and pinion, as described, combined with the spider F, having arm $F^5$, provided with ratchet friction-wheel $f^6$, and the inclined shaft $S^2$, provided with the bevel-wheel $s^7$, which engages the pinion upon the crimper-rod for rotation thereof.

14. In a machine for filling cartridge-shells, a crimper-rod which is mounted upon a spider which has vertical reciprocation upon the main central shaft of the machine, which has an end recess which is reversely cup-shaped, imperforate, and without annular recess or other depression within its cavity, and which in its inner extremity is slightly indrawn or diminished in diameter, so as in the downward movement of the rod to bear obliquely inward against the periphery of the upper extremity of the shell, in combination with a revoluble shaft which by an end wheel engages the crimper-rod for rotation thereof, substantially as and for the purposes described.

15. In a machine for filling cartridge-shells, the fixed bed-frame, a rotary carrier having a series of cylindrical shell-receptacles, a cam-lever mounted upon the bed-frame and engaging the shell-receptacles successively to cause rotation of the carrier, and a dog pivotally mounted upon the bed-frame and intermittently engaging the front of the shell-receptacles in succession, in combination, as specified.

16. In a machine for filling cartridge-shells, the fixed bed-frame, the rotary shell-carrier concentric with and having motion upon such bed-frame, the cam-lever pivoted upon the bed-frame and actuated by the power-shaft, and the pivoted dog intermittently actuated by the cam-lever, in combination, substantially as described and shown.

17. In a machine for filling cartridge-shells, a shell-ejecting rod which is mounted upon an intermittently-reciprocating portion of the machine and a pivoted spring-actuated intermittently-operating dog which is mounted upon the bed-frame or equivalent fixed portion of the machine and which is provided with an inking-roller which in the operation of ejecting the shell intermittently engages the contact end of the ejecting-rod to ink the same, in combination, substantially as specified.

18. In a machine for filling cartridge-shells, a vertically-placed reciprocating crimper-rod which is provided with an engaging-rack, a toothed wheel which is operable by the power-shaft of the machine, which engages the rack upon the crimper-rod, an upper spider which carries a ratchet friction-wheel which operates in connection with the toothed wheel, and a friction-arm also upon such upper spider, which bears upon the surface of the friction-wheel, in combination, as described.

19. In a machine for filling cartridge-shells and in combination with an upper spider thereof, a vertically-reciprocating crimper-rod which is provided with a longitudinal groove and which receives rotary motion by means of a gear-wheel which is loosely received upon the body of the rod, which has a feather or ridge upon its central opening, and which operates in the longitudinal groove, and a gear-wheel on the crimper-actuating shaft, which engages the gear-surface upon the crimper-rod, the crimper and spider actuating shaft being actuated by the power-shaft and the crimper-rod receiving motion in a vertical plane by means of an arm upon such spider, in which it is mounted, the arm carrying an adjustable friction-arm and a ratchet friction-wheel.

20. In a machine for filling cartridge-shells, a fixed bed-frame, a rotary shell-carrier which is concentric with and has motion upon such bed-frame and a double cam-lever which has an outer face which engages the receptacles of the carrier to rotate the same and an inner face which engages the outer extremity of a centrally-pivoted dog, the inner extremity of which in turn successively engages the front of the shell-receptacles, thereby momentarily checking and locking the rotary carrier at the end of each movement, in combination.

21. In a machine for filling cartridge-shells, a reciprocating shell-ejecting rod and a centrally-pivoted spring-actuated dog which is mounted upon a fixed portion of the machine and which carries on its inner extremity a spring-supported inking-roller, such inner extremity by the actuation of the spring during each movement of the carrier when it is free to act through lack of contact with the shell-receptacles carrying its inking-roller across the contact end of the shell-ejecting rod for the purpose of inking the same, in combination, substantially as described.

22. In a machine for filling cartridge-shells, a fixed bed-frame, a vertical reciprocating shaft in such bed-frame, a vertical rotating shaft secured in the body of the bed-frame, a shell-distributing receptacle fixed upon the rotating shaft in a plane below the bed-frame, and a reciprocating plunger actuated by the vertical reciprocating shaft and operating in connection with the shell-distributing receptacle at regular intervals by successive thrusts from below to eject the shells upwardly, in combination, substantially as described.

23. In a machine for filling cartridge-shells, a fixed bed-frame, a pivoted rotary shell-carrier upon the bed-frame, a power-shaft mounted in bearings below the bed-frame, a cam-lever, and a star-wheel, each pivoted upon the bed-frame, the power-shaft primarily actuating the cam-lever, the cam-lever actuating the shell-carrier, and the shell-carrier operating the star-wheel, and the cam-lever and the star-wheel operating simultaneously in direct contact with the rotary shell-carrier, in combination.

24. In a machine for filling cartridge-shells, a rotary shell-receiver below the bed-frame of the machine, each of the shell-holders of which has a stop at its lower extremity, a rotary shell-carrier above the bed-frame of the machine, each of the shell-holders of which has a shell-engaging spring at its upper extremity, and a plunger which operates to lift the shells from the stops in the receiver below the bed-frame and to thrust them forcibly upward into engagement with the springs of the holders in the carrier above the bed-frame, in combination.

25. In a machine for filling cartridge-shells, a fixed bed-frame, a rear vertically-placed rotary shaft which is received in an opening in such bed-frame, which is provided below the plane of the bed-frame with a shell receiver and distributer, which is provided above the plane of the bed-frame with a horizontally-arranged wheel which has projecting arms, and which is provided above the horizontal wheel with a pinion which in the operation of the machine imparts motion to the shell-delivering apparatus of the primary shell receptacle or reservoir, in combination.

26. In a machine for filling cartridge-shells, a fixed bed-frame, a rotary shell-carrier upon the fixed bed-frame, and a spring which is secured by one extremity to the bed-frame and which extends inwardly within the vertical plane of the rotary shell-carrier and below the horizontal plane of the same and which when a completed cartridge is being ejected serves to temporarily support the same, in combination, substantially as shown and described.

27. In a machine for filling cartridge-shells, a rotary shell-carrier, a vertically-arranged wheel which is journaled in bearings in the machine below the shell-carrier, and a cartridge-discharging chute which is secured upon the machine and which overhangs the vertically-arranged wheel, the periphery of which projects into the body of the chute and in the operation of the machine engages and directs the cartridges, in combination, substantially as and for the purposes set forth.

28. In a machine for filling cartridge-shells, a vertical rotary shaft which is secured in the bed-frame at the rear of the machine, an intermediate shell-receptacle which is fixed upon such vertical rotary shaft, and a plunger below the shell-receptacle, which is secured upon such vertical shaft and is movable up or down thereon, which at one side has an upwardly-extending rod or cylinder, and which at its opposite side is pivotally connected to a pivoted operating-lever, combined for operation, substantially as specified.

29. In a machine for filling cartridge-shells, a fixed bed-frame, a rotary shell-carrier upon the bed-frame, a vertical rod rigidly but adjustably secured in the bed-frame in a plane outside the path of the rotary shell-carrier, a sleeve upon the vertical rod, resting at its foot upon the bed-frame, a star-wheel upon the rod, resting upon the upper extremity of the sleeve and adapted to be engaged by a shell in the rotary carrier, a cylindrical flanged hub upon the star-wheel, a cut-off plate upon the flange of the hub, a measuring-section upon the cut-off plate, and a receiving-plate provided with cylinders which extend downwardly into the measuring-section and form a part thereof, in combination.

30. In a machine for filling cartridge-shells, an ammunition-supplying apparatus which embraces a cut-off plate, a receiving-plate in which are secured depending cylinders, one or more, which ordinarily measure the charge of ammunition, an intermediate section through which the depending cylinders extend, a central vertical rod upon which the three described parts are loosely received and which at its upper extremity is provided with a vertically-adjustable nut, and a spring which encircles the central rod and bears against the bottom of the receiving-plate and against the top of the cut-off plate, as described.

31. In a machine for filling cartridge-shells, a rotary shell-carrier, a spider which has arms which at their outer extremities are divided into an upper and a lower member, a wad-plate which has equidistant wad-openings, which rests upon the upper surface of the lower member, and which has a downward extension which terminates in a star-wheel which is engaged by the shell in the rotary carrier and which has also a holding-arm which has a central eye by which it is received upon a spring-bearing rod, an outer hub or eye by which it is received upon the wad-tube, and a horizontal arm which extends along the surface of the wad-plate and overlies one of the wad-openings in the same, in combination.

32. In a machine for filling cartridge-shells, a rotary shell-carrier and a spider which has arms which at their outer extremities are divided into an upper and a lower member, the lower member supporting the wad-plate and its carrier-engaging star-wheel and the upper member having three vertical cylindrical openings, the inner opening receiving a wad-rammer, the outer opening receiving a wad-discharging tube, and the central opening receiving a spring-bearing rod, in combination.

33. In a machine for filling cartridge-shells, a rotary shell-carrier, an upper spider, and a lower spider, in combination, the upper spider carrying the wad-rammers, the lower spider carrying the wad-tubes, and the rotary shell-carrier conveying the shells, and both the spiders having reciprocating motion in a vertical plane, substantially as described.

34. In a machine for filling cartridge-shells, a rotary shell-carrier, an upper spider, and a lower spider, in combination, the upper spider being rigidly secured to the main vertical reciprocating shaft and the lower spider being loosely received by its hub upon the lower sleeve of such main reciprocating shaft and having movement up and down thereon, substantially as specified.

35. In a machine for filling cartridge-shells, a rotary shell-carrier, a lower spider which has slight reciprocation in a vertical plane and which carries a wad-supplying apparatus, and an upper spider which has greater reciprocation in a vertical plane and which has a central hub and outwardly-extending arms in which a wad-rammer is supported, in combination, substantially as and for the purposes set forth.

36. In a machine for filling cartridge-shells, a wad-pusher and a wad-starting opening, a reciprocating wad-rammer upon which is a rack, a toothed wheel which engages the rack upon the wad-rammer, a ratchet and friction wheel which operate in connection with the toothed wheel, and an adjustable friction-arm which bears upon the face of the friction-wheel, in combination, substantially as described.

37. In a machine for filling cartridge-shells, a wad-rammer which is supported in suitable guides upon the machine and which is provided with an engaging-rack which is fixed upon or forms a part of such rammer, a wad-opening which is coincident with the wad-rammer, a reciprocating arm which is operated by the power-shaft and which carries a toothed wheel which engages the rack-bar upon the wad-rammer, a ratchet and friction wheel which operate in connection with the toothed wheel upon the reciprocating arm, and an adjustable friction-arm which bears upon the face of the friction-wheel, in combination, as described.

38. In a machine for filling cartridge-shells, a rotary shell-carrier, a lower wad-supplying spider above the rotary shell-carrier, and an upper spider which has a central hub and arms which are provided with a wad-rammer, with a gear-wheel which engages the wad-rammer, with a recessed ratchet-wheel, with a fixed arm within the recess, which is provided with a pawl which engages the serrations in the wheel and which is provided, also, with a friction-arm which bears upon the outer face of the ratchet-wheel, in combination, substantially as shown and set forth.

39. In a machine for filling cartridge-shells, an upper vertically-reciprocating spider which has outwardly-extending arms, combined with a rotary shell-carrier upon the bed-frame of the machine and with a wad-delivering apparatus which is provided with an actuating-spring, with a slidable tube-encircling ring which is surmounted by a wad-hopper, and with a tripping-dog which in the downward movement of the reciprocating spider is engaged by one of the arms thereof and is tripped, thereby relieving the spring from compression and permitting it to force upwardly the slidable tube-encircling ring and its connected arm and wad-hopper, substantially as and for the purposes set forth.

40. In a machine for filling cartridge-shells, a primary wad-supplying receptacle or hopper which has a diminished cylindrical downwardly-extending continuation which is adapted to constitute a sleeve for the upper extremity of the wad-tube and which is provided with an arm which terminates downwardly in a short sleeve or ring which encircles the body of the wad-tube, in combination with a spring which is mounted upon the tube-supports and with means for alternately compressing and releasing such spring, whereby in the operation of the machine the spring acts intermittently to thrust the wad-hopper forcibly upward.

41. In a machine for filling cartridge-shells, a central vertical reciprocating shaft and a spider which is rigidly secured to such shaft and has reciprocation therewith and which has a series of outwardly-extending arms, each of which carries a wad-rammer, and a friction-wheel which operates in connection with such rammer, which has also an arm which carries a shell-crimping rod, and which has also an arm in which is rigidly secured a cartridge-ejecting rod, in combination.

42. In a machine for filling cartridge-shells, a central vertical reciprocating shaft, an upper spider upon such reciprocating shaft, a lower sleeve upon the reciprocating shaft, a spider loosely received upon such lower sleeve, and a vertical headed connecting-rod which is fixed in the lower spider and which normally extends a short distance above the upper spider and which in the upward movement of the upper spider is engaged by it and serves to cause upward movement of the lower spider, in combination, substantially as and for the purpose specified.

43. In a machine for filling cartridge-shells, a shot-discharging apparatus which is provided with a cut-off plate which has an outwardly and downwardly extending arm, in combination with a spider which has an end bifurcation, the lower member of which is provided with a downwardly-extending leg or stop against which the downwardly-extending arm of the cut-off plate is received and by which it is held against rotation.

44. In the shot-discharging apparatus of a machine for filling cartridges, a receiving-plate which has discharge-openings, a primary receptacle and discharger which has a depending outlet-cylinder, and a vertically-walled guard or guideway which rests upon the upper surface of the receiving-plate, in combination, substantially as and for the purpose specified.

45. In a machine for filling cartridge-shells, a fixed bed-frame, a rotary shell-carrier upon the bed-frame, a vertical shaft loosely secured in the bed-frame and having a fixed star-wheel and a fixed pinion, and a shell-reservoir which has a shell-discharging wheel which is in engagement with the pinion upon the vertical shaft, in combination with a cam-lever which is actuated by the power-shaft of the machine and which imparts motion successively to the rotary shell-carrier, the star-wheel, the vertical shaft, the pinion, and the shell-discharging wheel, substantially as set forth.

46. In a machine for filling cartridge-shells, a shell-reservoir which is provided with a discharging-wheel which at its front consists of a gear-face which is engaged by a pinion upon an actuating-shaft and which at its rear consists of shell-engaging fingers which extend horizontally backward from the body of the wheel, each pair of such fingers being adapted to receive between them one of the shells and to move it continuously forward, while retaining it in its horizontality to the point of discharge.

47. In a machine for filling cartridge-shells, a shell-discharging reservoir which is provided with a fingered shell arranging and propelling wheel, and which has in connection with such wheel an upper curved shell-supporting plate which is within the inner periphery of the wheel, and which has lower supporting-plates which are without or below the outer periphery of the wheel, whereby the shells both above and below are prevented from falling between the fingers, substantially as set forth.

48. In a machine for filling cartridge-shells, an intermediate horizontally-revoluble shell-carrier which has concentrically-arranged shell-receptacles, each of which has at its lower and outer extremity an interior shell-supporting lug or stop, whereby ordinarily the shell will be supported head downward within the receptacle and whereby when a shell has been improperly delivered into the receptacle it will not be retained, but will by its rim engage the stop or lug and will thereby be thrown outwardly away from the central shaft of the carrier.

49. In a machine for filling cartridge-shells, a bed-frame which is provided at a point immediately below the crimper-rod with a shell-recess and with a shell-engaging plate which extends upwardly to a point above the plane of such bed-frame.

WILLIAM W. BABCOCK.

Witnesses:
WALLACE J. PEIRPONT,
JOSIAH BABCOCK, Jr.